United States Patent
Celestino et al.

(10) Patent No.: US 12,491,066 B2
(45) Date of Patent: Dec. 9, 2025

(54) INTRAOCULAR LENS WITH EXTENDED DEPTH OF FOCUS

(71) Applicants: PHYSIOL SA, Angleur (BE); CONSEJO SUPERIOR DE INVESTIGACIONES CIENTÍFICAS (CSIC), Madrid (ES)

(72) Inventors: Susana Marcos Celestino, Madrid (ES); Carlos Dorronsoro Diaz, Madrid (ES); Suad Redzovic, Jupille sur Meuse (BE); Christophe Pagnoulle, Verviers (BE)

(73) Assignees: PhysIOL SA, Angleur (BE); Consejo Superior de Investigaciones Scientificas (CSIC), Madrid (ES)

( * ) Notice: Subject to any disclaimer, the term of this patent is extended or adjusted under 35 U.S.C. 154(b) by 970 days.

(21) Appl. No.: 17/635,617

(22) PCT Filed: Sep. 10, 2020

(86) PCT No.: PCT/EP2020/075273
§ 371 (c)(1),
(2) Date: Feb. 15, 2022

(87) PCT Pub. No.: WO2021/048248
PCT Pub. Date: Mar. 18, 2021

(65) Prior Publication Data
US 2022/0287824 A1    Sep. 15, 2022

(30) Foreign Application Priority Data

Sep. 11, 2019 (ES) .............................. ES201930791
Oct. 9, 2019 (BE) ................................. 2019/5669

(51) Int. Cl.
*A61F 2/16* (2006.01)
*B29D 11/02* (2006.01)

(52) U.S. Cl.
CPC ............ *A61F 2/1616* (2013.01); *A61F 2/164* (2015.04); *B29D 11/023* (2013.01); *A61F 2002/1681* (2013.01); *A61F 2240/004* (2013.01)

(58) Field of Classification Search
CPC ................... A61F 2/1616; A61F 2/164; A61F 2002/1681; A61F 2240/004; A61F 2/1602; A61F 2/1613; A61F 2/1618; B29D 11/023
See application file for complete search history.

(56) References Cited

U.S. PATENT DOCUMENTS 6,926,744 B1    8/2005  Bos et al.
12,232,952 B2 *  2/2025  Pinto .................... A61F 2/1618
(Continued)

FOREIGN PATENT DOCUMENTS

BE    1027570 A1    4/2021
CN    107468377 A   12/2017
(Continued)

OTHER PUBLICATIONS

Fernandez et al., Multifocal intraocular lens providing optimized through-focus performance; Optics Letters; Dec. 15, 2013; pp. 5303-5306; vol. 38; No. 24.
(Continued)

*Primary Examiner* — Bruce E Snow
(74) *Attorney, Agent, or Firm* — CHRISTENSEN O'CONNOR JOHNSON KINDNESS PLLC

(57) ABSTRACT

The invention relates to an intraocular lens with extended depth of focus including aspheric anterior and posterior optical surfaces.

19 Claims, 13 Drawing Sheets

(56) References Cited

U.S. PATENT DOCUMENTS

| | | | |
|---|---|---|---|
| 2009/0204208 A1* | 8/2009 | Simpson | A61F 2/1613 623/6.23 |
| 2014/0358225 A1 | 12/2014 | Wang | |
| 2019/0021847 A1 | 1/2019 | Hong et al. | |
| 2022/0287824 A1* | 9/2022 | Celestino | A61F 2/1616 |
| 2025/0082462 A1* | 3/2025 | Hong | G02C 7/041 |
| 2025/0152335 A1* | 5/2025 | Canovas Vidal | A61F 2/1637 |

FOREIGN PATENT DOCUMENTS

| | | |
|---|---|---|
| EP | 1257236 A1 | 11/2002 |
| WO | 01/62188 A1 | 8/2001 |
| WO | 2006/060477 A2 | 6/2006 |
| WO | 2014/102352 A1 | 7/2014 |
| WO | 2014/135986 A2 | 9/2014 |
| WO | 2015/022514 A1 | 2/2015 |

OTHER PUBLICATIONS

International Search Report and Written Opinion of the International Searching Authority mailed Dec. 16, 2020, issued in corresponding International Application No. PCT/EP2020/075273, filed Sep. 10, 2020, 14 pages.

\* cited by examiner

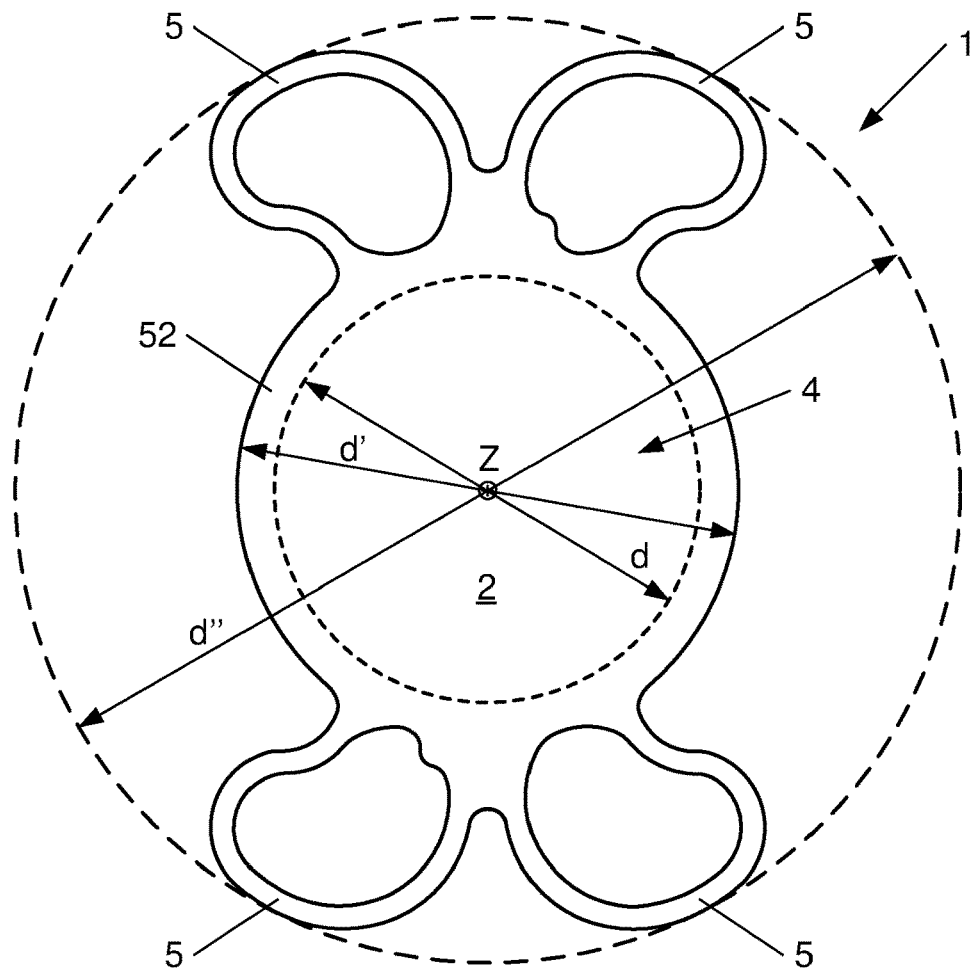
Fig. 1
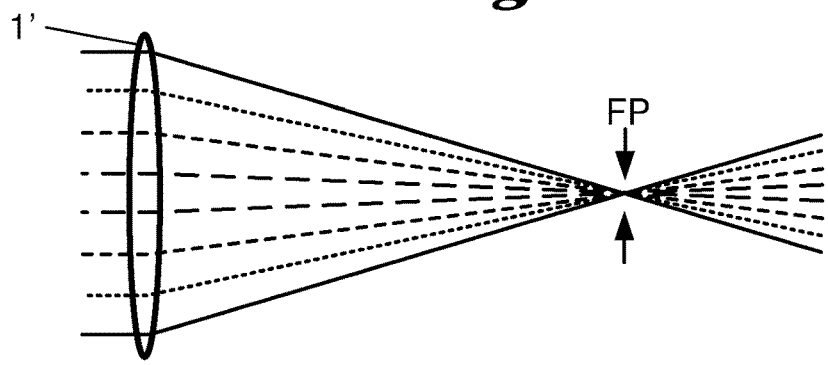
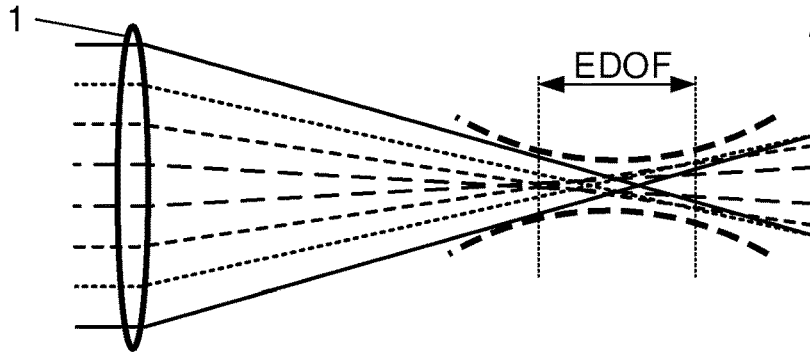
Fig. 2

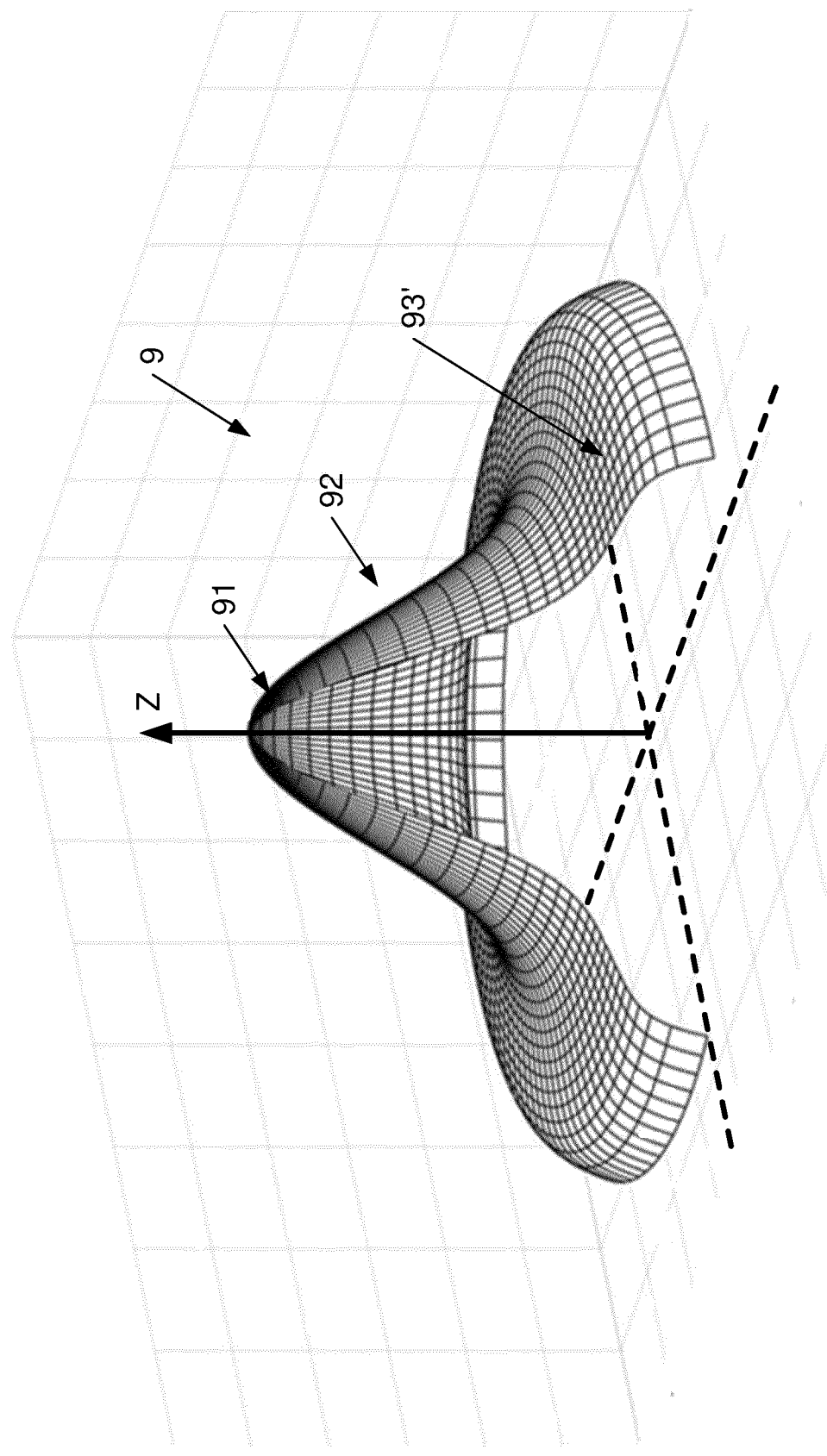

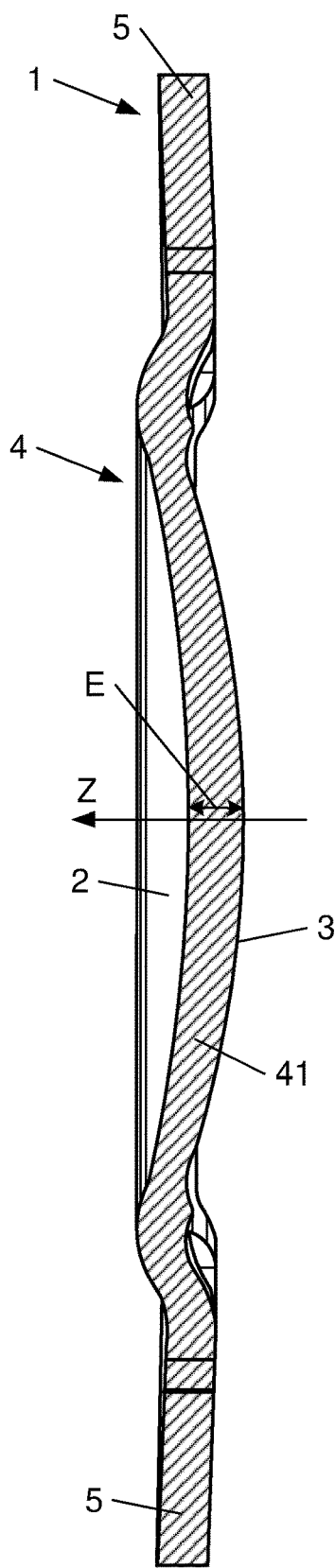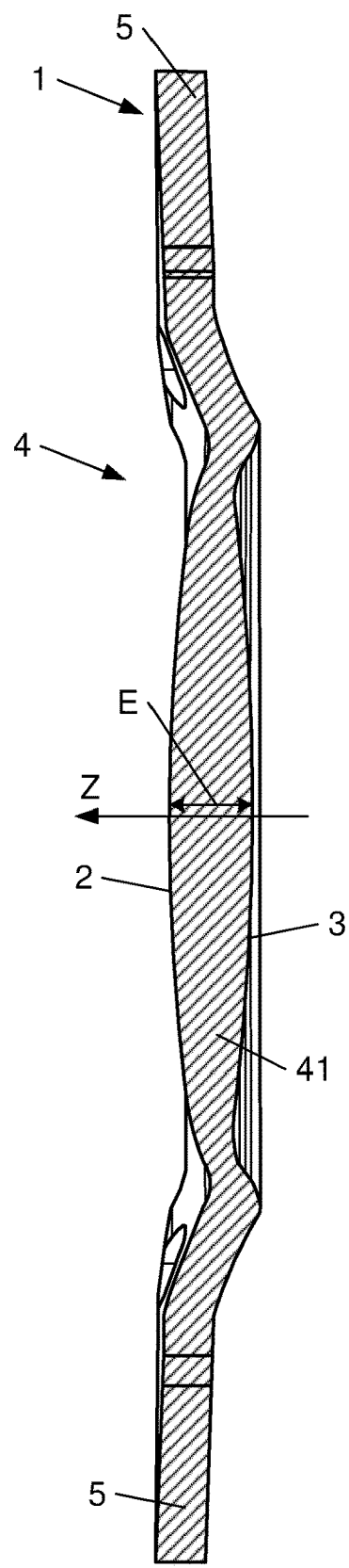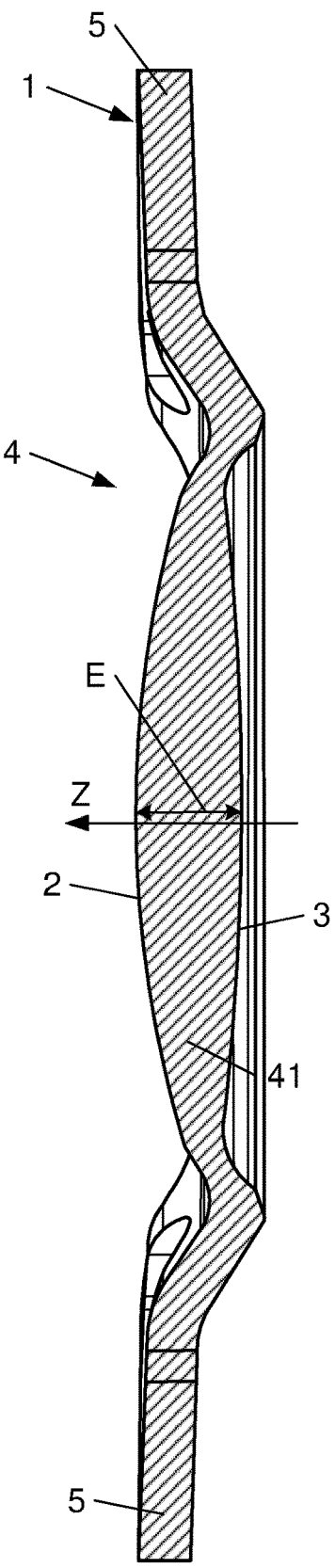
*Fig. 11A*   *Fig. 11B*   *Fig. 11C*

INTRAOCULAR LENS WITH EXTENDED DEPTH OF FOCUS

TECHNICAL FIELD

The present invention concerns an intraocular lens (IOL). More specifically, it concerns an intraocular lens with extended depth of focus (EDOF).

PRIOR ART

Age-related changes of proteins in the natural crystalline lens of an eye can lead to cataract formation. In cataract surgery, the natural crystalline lens is generally replaced by an IOL.

An implantation of a monofocal IOL generally provides a good quality vision by selecting an appropriate IOL power usually adjusted to far distances.

Nevertheless, an eye with an implanted IOL loses the ability of residual accommodations. It follows that the patient with an implanted monofocal IOL usually needs to wear glasses for near and intermediate distances during activities requiring finer vision capabilities. This refers to a wide range of activities such as reading and computer work, with possible strong consequences in the patient day-to-day life.

Nowadays, patients increasingly want to avoid to wear glasses for near vision after cataract surgery. Multifocal IOLs are then becoming more widely used in order to try to compensate the above-mentioned monofocal IOLs weakness.

However, multifocal IOLs typically have a limited number of two or three focus points while providing a poor vision quality for out of focus distances. This can lead to difficulties with intermediate vision in the case of, for example, bifocal IOLs which are designed with two focal points for near and far distances, respectively, and then to the necessity for the patient to wear glasses. Another disadvantage in the specific case of diffractive multifocal IOLs is related to the existence of a proportion of incident light lost (about 18%) at high diffraction orders, which generate focal points out of the useful distance range for vision. Multifocal IOLs moreover present other disadvantageous side effects such as scattered light, halos and glare.

DISCLOSURE OF THE INVENTION

An object of the present invention is to provide an intraocular lens presenting a better quality vision at far and intermediate distances, while minimizing the above-mentioned side effects.

For this purpose, the present invention provides an intraocular lens comprising:
a (single) anterior optical surface, and
a (single) posterior optical surface,
both extending around and substantially radially outward relative to an optical axis;
characterized in that:
a first surface among the anterior and posterior optical surfaces is defined by the equation:

$$z_{st}(r) = \frac{r^2}{R_{st}\left(1 + \sqrt{1 - \frac{(1 + \kappa_{st}(R_{st}))r^2}{R_{st}^2}}\right)} + \sum_{i \geq 2} \alpha_{2i}^{st} r^{2i}$$

where:
$z_{st}(r)$ is a component, measured along the optical axis, of a displacement vector from a vertex of the first surface, to any point of the latter at a radius r (considered as a radial variable) from the optical axis;

$R_{st}$ ($\in \mathbb{R} \setminus \{0\}$) is a radius of curvature of the first surface evaluated at the (its) vertex;

$\kappa_{st}(R_{st})$ is a conic constant of the first surface evaluated at the (its) vertex and defined in function of said radius of curvature $R_{st}$ of the first surface by the relation:

$$\kappa_{st}(R_{st}) = \begin{cases} aR_{st}^2 + bR_{st} + c & \text{if } R_{st} < 0 \\ A[\text{erf}(BR_{st} + C) + D] & \text{if } R_{st} > 0 \end{cases}$$

where erf denotes a (the) Gauss error function, and where a, b, c, A, B, C, D are constant real numbers such that:
$a \in [0.050; 0.075]$, $b \in [-1; 0]$, $c \in [-20; 0]$, $A \in [-41; -39]$,
$B \in [0.07; 0.13]$, $C \in [-2.6; -2.0]$ and $D \in [0.75; 1.25]$;
(for each $i \geq 2$) $\alpha_{2i}^{st}$ ($\in \mathbb{R}$) is a coefficient of asphericity of order 2i of the first surface;
a second surface among the anterior and posterior optical surfaces is defined by the equation:

$$z_{nd}(r) = \frac{r^2}{R_{nd}\left(1 + \sqrt{1 - \frac{(1 + \kappa_{nd}(R_{nd}))r^2}{R_{nd}^2}}\right)} + \sum_{i \geq 2} \alpha_{2i}^{nd} r^{2i}$$

where:
$z_{nd}(r)$ is a component, measured along the optical axis, of a displacement vector from a vertex of the second surface to any point of the latter at a radius r (considered as a radial variable) from the optical axis;

$R_{nd} < 0$ is a radius of curvature of the second surface evaluated at the (its) vertex;

$\kappa_{nd}(R_{nd})$ is a conic constant of the second surface evaluated at the (its) vertex and defined in function of said radius of curvature $R_{nd}$ of the second surface by the relation:

$\kappa_{nd}(R_{nd}) = fR_{nd}^2 + gR_{nd} + h$ where f, g, h are constant real numbers such that:
$f \in [0.08; 0.12]$, $g \in [1.0; 1.6]$ and $h \in [0; 9]$;
(for each $i \geq 2$) $\alpha_{2i}^{nd}$ ($\in \mathbb{R}$) is a coefficient of asphericity of order 2i of the second surface.
The anterior and posterior optical surfaces (or equivalently, said first and second surfaces) are such that the intraocular lens provides an extended depth of focus.

The intraocular lens (IOL) according to the invention presents a better quality vision at far and intermediate distances (than a bifocal IOLs with two focal points for far and near distances, for example), while both minimizing side effects such as scattered light, halos and glare, and providing better quality of vision at far distances (than a standard monofocal IOL, for example).

In fact, the IOL comprises an optic (or central optic part) comprising an anterior surface (so-called anterior optical surface) and a posterior surface (so-called posterior optical surface) described by an equation of the same form. It is well known by a skilled person that such an equation defines an aspheric surface (as reviewed in the detailed description, in view of the FIG. 4 hereafter introduced). Therefore, both the anterior and the posterior optical surfaces are aspheric, providing then an optic with a fully aspheric design which generates more negative spherical aberrations and allows, with the contribution of the parameters of the surfaces equations, for an extension of the depth of focus (i.e. providing a single elongated focal point to enhance "range of vision"), in comparison with a standard monofocal IOL. This is additionally commented and illustrated in the detailed description, in view of the FIGS. 6A-C, 7, 8, 9A-C, hereafter introduced, which present results from experimental measurements.

The IOL according to the invention could be considered as a monofocal IOL as it causes a single focal point (as for a monofocal IOL) to be elongated in order to enhance depth of focus (or range of vision). It is not conceived as a multifocal IOL with regularized optical power map between focus points, nor as a multizonal optical power IOL. This is noticeable as most monofocal IOLs only correct vision to help patients with cataracts see things at (far) distances, and thus do not improve the intermediate vision required for many important daily tasks. Differently, the present monofocal IOL (with an elongated focal point) offers an improved quality intermediate vision, as well as (far) good distances vision, which is a major advancement to allow patients greater ease in activities in their day-to-day lives.

The IOL according to the invention advantageously provides an extended depth of focus (EDOF) while minimally affecting peak (i.e. best focus) resolution, providing clear vision at intermediate distance and minimizing side effects, such as scattered light, halos and glare, which are common for multifocal IOLs. In fact, refractive multifocal IOLs generally comprises a multizonal optic (and then anterior and posterior optical surfaces) divided into various sections (with surfaces geometry that are potentially described by different equations) which can cause diffraction problems such as halos due to abrupt changes of geometry and/or optical power between these sections. Differently, the IOL of the invention comprises a single continuous and regular (or, in other words, at least differentiable or smooth) anterior optical surface and a single continuous and regular posterior surface, each surface being aspheric and described by a single smooth equation, which prevents such halos. It will be clearly understood by a skilled person that an IOL optical surface can be checked as satisfying such an equation (in general either by simple profile comparison or superposition, or, if a deeper analysis is needed, obtaining measures of points on (a sectional curves of) the IOL surface and comparing such measures with the equation for determining the IOL optical surface equation. Comparison of the IOL optical performances, such as the EDOF or other as described in the detailed description, can also be applied.

The IOL according to the invention is preferentially refractive, more preferentially purely refractive. More specifically, the characteristics optically provided by the anterior and posterior surfaces are preferably refractive. Nevertheless, an IOL comprising any diffractive feature (such as a component, a portion of optical surface, . . . ) is not be excluded from the scope of the invention.

Another important aspect of the present invention is that the claimed EDOF depends in a limited way (or, in other words, is relatively independent of) on:

the IOL optical power,
an aperture (i.e. an opening through which light travels; for example, an eye pupil diameter when the IOL is in a normal use in an aphakic eye), and
corneal spherical aberrations (for example, spherical aberrations of a cornea model, or spherical aberrations of an eye cornea when the IOL is in a normal use in an aphakic eye).

This is additionally commented in the detailed description, in view of the FIGS. 6A-B and 7, hereafter introduced. Nevertheless, the good control of EDOF, aperture and corneal spherical aberrations dependency on the IOL optical power can also be understood from the aspheric equations defining for the anterior and posterior optical surfaces. In fact, it is known by a skilled person that the optical power from an optical surface in general depends on the refraction index associated to a raw material constituting this surface, as well as on the geometry of this surface. The latter is determined (at least for small orders of r) by the radius of curvature and (optionally) by the conic constant of this optical surface evaluated at its vertex. In the present context, it is rational to assume that both this refractive index and the contribution of each of the anterior and posterior optical surfaces on the global IOL optical power are known. In addition, each of the conic constant of the anterior and posterior optical surfaces is defined in function of the radius of curvature of this surface by a completely new, specific and very advantageous smooth relations. As a consequence, at least at small orders, for each IOL optical power, each of the anterior and posterior optical surfaces is characterized by its radius of curvature. As all the relations between these parameters and the IOL optical power are regular, the variations of the geometry of the anterior and posterior optical surfaces with respect to the IOL optical power are then predetermined and regular, which allows (at least locally) a very advantageous controlled and regular variation of the EDOF with respect to the IOL optical power, the aperture and corneal spherical aberrations.

These direct or indirect controlled regular variations of the parameters in the anterior and posterior optical surfaces equations with respect to the IOL optical power is highly important to achieve this technical effect. In particular, it has to be underlined that the present invention proposes a global optimization of the equations parameters by taking into account this goal for limited EDOF dependency. It does not use any separated optimization of each of the parameters independently for each IOL optical power, which would be a more naïve approach but also would generate a high EDOF dependency on the IOL optical power.

Moreover, and advantageously, the invention also takes into account the modulation transfer function (MTF) (i.e. an optical bench measurement used to evaluate the performance of a lens, roughly speaking an image resolution function; more specifically, this function is known by a skilled person and specifies how much contrast is captured as a function of spatial frequency) which is associated with the IOL. In general, the MTF at best focus (i.e. for far distances) is inversely related to the EDOF which makes very difficult to obtain both MTF and EDOF limited dependency on the IOL optical power, the spherical aberrations of a model cornea which equips an optical bench, and the aperture. But, in the case of the present invention, the equations parameters defining the anterior and posterior optical surfaces vary in such a way to get such limited dependency. This is illustrated in the detailed description, in view of the FIGS. 6C and 8, hereafter introduced. The intervals for the constant real numbers are chosen around specific preferred values detailed hereafter. These values optimize both the EDOF and the MTF for optical surfaces made of an average raw biomaterial of an average refraction index (e.g. about 1.52), in the sense that they consist in a regular good compromise between providing an optimized EDOF or an optimized MTF, for the considered optical powers (of which the radius of curvature of the optical surfaces depend). In order to take into account such values variations that can be due to raw biomaterial choice and/or IOL manufacture technics, it is highly relevant to consider the above-mentioned intervals, including such practical uncertainties.

Another advantage of the present invention is that these relations between the EDOF, the IOL optical power and the equations parameters make the IOL of different optical powers more easy to design in view of manufacturing by using current technologies as it can be configured by using said equations as well as the relations $\kappa_{st}(R_{st})$ and $\kappa_{nd}(R_{nd})$. More generally, it can to be pointed out that these new relations expressing the conic constant of the anterior and posterior optical surfaces of the IOL according to the invention in function of the radius of curvature of this surface advantageously opens technical perspectives in designing and/or manufacturing IOLs, in particular monofocal IOLs comprising an optical surface whose conic constant is expressed in function of its radius of curvature through one of these relations.

In the framework of the present document, an "optical axis" of an eye consists preferentially in a vector crossing the eye from one side to the other, directed by its anterior segment, comprising successively, the cornea, the iris and the (natural crystalline or claimed intraocular) lens, to its posterior segment, comprising especially the retina. For an IOL according to the invention in an implantation position in an eye, the optical axis of the eye is directed from the anterior surface to the posterior surface and preferentially corresponds to the optical axis defined intrinsically with respect to the IOL. In particular, the term optical axis is presently and preferentially used in this document as the reference axis with respect to the eye and/or to the IOL.

In the framework of the present document, an "anterior" (or respectively, "posterior") side and/or surface of a part of an eye or of an IOL consists preferentially in a side and/or a surface located upstream (or respectively, downstream) of the part of the eye or of the IOL relative to the vector defined by the optical axis. As an example, in an eye, the iris is located anteriorly with respect to the (natural crystalline or claimed intraocular) lens; a posterior surface of the iris is therefore a part of the iris that is the closest to this lens. Likewise, when a first part of an eye or of an IOL is anteriorly (or respectively, posteriorly) above a second part of an eye or an IOL, it follows that this first part is located anteriorly (or respectively, posteriorly) with respect to this second part. Likewise, an optical surface is said "anteriorly concave (resp. convex)" when it is seen as concave (resp. convex) by looking at the optical surface in the same direction and the same sense as the vector defined by the optical axis (i.e. following light rays propagations), and an optical surface is said "posteriorly concave (resp. convex)" when it is seen as concave (resp. convex) by looking at the optical surface in the same direction and the opposite sense as the vector defined by the optical axis. The aforementioned notions of anteriority, posteriority or even of an optical axis relative to parts of an eye and/or an IOL are known to person skilled in the art.

In the framework of the present invention, the first and second surfaces are always different. Preferably, in the framework of the whole document, the first surface is the anterior optical surface and the second surface is the posterior optical surface. Nevertheless, it is possible to invert the IOL surfaces in the framework of the invention while keeping the main advantageous optical properties detailed here above. For reading facility, in the framework of this document, the index st and nd for the equations parameters are replaced by the index ant and post when it is specifically referred to the anterior or the posterior optical surface parameters. For example, $R_{ant}$ and $R_{post}$ correspond to the radii of curvature of the anterior and posterior optical surfaces respectively (being evaluated at their respective vertex). The index st and nd are also respectively replaced by the index ant and post in the framework of this document, when the first and second surfaces are deemed to be the anterior and posterior optical surfaces respectively.

In the framework of the present invention, as usually known by a skilled person, the "vertex" of an optical surface (for example, the anterior optical surface or the posterior optical surface) is preferably defined as an intersection point of this optical surface with the optical axis.

In the framework of this invention, the "radius of curvature" of an aspheric surface (for example, the anterior optical or the posterior optical surfaces) evaluated at the vertex of this surface is the distance between said vertex and a center of curvature of the surface at this vertex. The conventional sign for this radius of curvature is preferentially defined as being the sign of the component, measured along the optical axis, of the displacement (vector) from said vertex to said center of curvature. Then, the anterior optical surface is anteriorly concave (resp. anteriorly convex) at its vertex if and only of its radius of curvature evaluated at its vertex is negative (resp. positive), and the posterior optical surface is posteriorly concave (resp. posteriorly convex) at its vertex if and only of its radius of curvature evaluated at its vertex is positive (resp. negative). In particular, for the IOL according to the present invention, as $R_{nd}<0$, the second surface of the IOL is posteriorly convex and anteriorly concave at and around its vertex.

According to the terminology of a skilled person, the IOL according to the invention is said "bi-convex" if $R_{ant}>0$ and $R_{post}<0$, i.e. if and only if the anterior optical surface is anteriorly convex and if the posterior optical surface is posteriorly convex. According to the terminology of a skilled person, the IOL according to the invention is said "concave-convex" if $R_{ant}<0$ and $R_{post}<0$, i.e. if the anterior optical surface is anteriorly concave and if the posterior optical surface is posteriorly convex. These terminologies of a skilled person report on the outside appearance of the IOL, the anterior optical surface being seen anteriorly and the posterior optical surface being seen posteriorly.

In the framework of the present invention, it is said that part of an IOL extends "radially outward" when it extends preferentially according to vectors perpendicular to the optical axis, directed from a point in common with the optical axis to points of a circle centered at this common point. Likewise, it is said that a part of an IOL extends "circumferentially" when it extends preferentially along at least an arc of a circle on a plane perpendicular to the optical axis and centered on an intersection point of the plane and the optical axis.

It is known by a person skilled in the art that the adjective "distal" refers to a part of a portion of a body the furthest form some reference organ or body trunk, and that the adjective "proximal" refers to another portion of a part of a body the closest to some reference organ or body trunk. In the framework of this document, these two definitions will apply preferentially to parts of an eye and/or parts of an IOL according to the invention, relative to a distance with respect to the referential optical axis.

In the framework of this invention, the term "intermediate distances" refers preferably to distances (around and/or approximately at and/or) at arm's length such as computer work or looking at a car speedometer. More preferably, this term refers to distance between 0.2 and 1.6 meters, more preferably, between 0.4 and 1.0 meters.

In the framework of this invention, some usual mathematical expressions are recalled as meaning:
"<0" means "negative", i.e. strictly smaller than 0;
">0" means "positive", i.e. strictly greater than 0;
"≤0" means "non-positive", i.e. smaller than or equal to 0;
"≥0" means "non-negative", i.e. greater than or equal to 0;
"∈" means "belongs to";
"$\mathbb{R}$" refers to the set of real numbers;
"$\mathbb{R}\setminus\{0\}$" refers to the set of non-zero real numbers;
for $\gamma \in \mathbb{R}$ and $\delta \in \mathbb{R}$ such that $\gamma < \delta$, "[$\gamma$, $\delta$]" refers to the closed interval of numbers between $\gamma$ and $\delta$, those being included.

In addition, it is also well known by Einstein summation convention that:

$$\sum_{i \geq 2} \alpha_{2i} r^{2i} = \alpha_4 r^4 + \alpha_6 r^6 + \alpha_8 r^8 + \alpha_{10} r^{10} + \ldots ,$$

the index "1" being here an integer greater than or equal to 2.

In the framework of the present document, the "Gauss error function" denoted by erf refers to the well-known invertible entire special function of sigmoid shape defined (in particular) on the real numbers by $$\mathrm{erf}: \mathbb{R} \to \mathbb{R}: x \mapsto \mathrm{erf}(x) := \frac{2}{\sqrt{\pi}} \int_0^x e^{-t^2} dt.$$

In the framework of this invention, the terms "regular" for a function or surface preferentially refers to an at least differentiable (or smooth) function or surface. In the framework of this invention, the terms "in function of", "depend on", and similar terms, should not be interpreted restrictively as a limited dependence on the specified parameters, unless such restriction is explicitly written.

In the framework of this document, the use of the indefinite article "a", "an" or the definite article "the" to introduce an element does not exclude the presence of a plurality of these elements. In this document, the terms "first", "second", "third" and the like are solely used to differentiate elements and do not imply any order in these elements.

In the framework of the present document, the use of the verbs "comprise", "include", "involve" or any other variant, as well as their conjugational forms, cannot exclude in any way the presence of elements other than those mentioned.

According to a preferred embodiment of the invention, the IOL has an optical power comprised between 10 D and 35 D. Optionally, it differs from 13.5 and/or 14 D.

In the framework of the present document, an "optical power" of an IOL is preferably a mean optical power measured without correction within a (reading) window centered on the optical axis with a diameter of 3 mm.

According to a preferred embodiment of the invention, the constant real numbers involved in the definition of the relations $\kappa_{st}(R_{st})$ and $\kappa_{nd}(R_{nd})$ are in the following restricted intervals of values:

a∈[0.060; 0.075] and/or b∈[−0.5; −0.2] and/or c∈[−12; −10]
and/or A∈[−40.1; −39.9] and/or B∈[0.080; 0.095] and/or C∈[−2.35; −2.05]
and/or D∈[0.9; 1.1]
and/or f∈[0.085; 0.105] and/or g∈[1.05; 1.40] and/or h∈[3; 6].

These intervals can be considered either independently or in combination. For example, a first part of these constant real numbers can be considered in the wider intervals of paragraph [0008], and a second part of these constant real numbers can be considered in these restricted intervals. Optionally, these restricted intervals are considered in combination, all the terms "and/or" being preferably "and". Alternatively, these constant real numbers are in other smaller intervals of values than the intervals of paragraph [0008] such that:

a∈[0.055; 0.070] and/or b∈[−0.7; −0.2] and/or c∈[−15; −5]
and/or A∈[−40.5; −39.5] and/or B∈[0.08; 0.10] and/or C∈[−2.4; −2.2]
and/or D∈[0.85; 1.15]
and/or f∈[0.09; 0.11] and/or g∈[1.20; 1.45] and/or h∈[3; 7].

These intervals can be considered either independently or in combination. For example, a first part of these constant real numbers can be considered in the wider intervals of paragraph [0008], a second part of these constant real numbers can be considered in the above-mentioned restricted intervals, and a third part of these constant real numbers can be considered in these other smaller intervals. Optionally, these other smaller intervals are considered in combination, all the terms "and/or" being preferably "and". These constant real numbers are be in even smaller intervals of values such that:

a∈[0.060; 0.065] and/or b∈[−0.5; −0.3] and/or c∈[−12; −10]
and/or A∈[−40.1; −39.9] and/or B∈[0.090; 0.095] and/or C∈[−2.35; −2.25]
and/or D∈[0.9; 1.1]
and/or f∈[0.095; 0.105] and/or g∈[1.25; 1.40] and/or h∈[4; 6].

These intervals can be considered either independently or in combination. For example, a first part of these constant real numbers can be considered in the wider intervals of paragraph [0008], a second part of these constant real numbers can be considered in the above-mentioned restricted intervals, a third part of these constant real numbers can be considered in the above-mentioned other smaller intervals, and a fourth part of these constant real numbers can be considered in these even smaller intervals. Very optionally, these intervals are considered in combination, all the terms "and/or" being preferably "and". As detailed above, the choice of intervals correspond to uncertainties, e.g. on the choice of raw biomaterial and/or manufacture technics of the intraocular lens, that can induce slight variations on the choice of radii of curvature or conic constants for optimizing both EDOF and MTF of the IOL at a given IOL optical power.

Exact values for each of these constant real numbers can be given optionally as:

a=0.0621 and/or b=−0.396 and/or c=−11.035
and/or A=−40 and/or B=0.092 and/or C=−2.29 and/or D=1
and/or f=0.0989 and/or g=1.277 and/or h=4.663.

Each of these values can be considered alone or in combination with one or more other values, all the terms "and/or" being preferably "and". The above-mentioned intervals for the value of the constant real numbers are around these specific values. It has to be pointed out that these values can be obtained by interpolation and/or approximation curves of particular real values chosen for the radius of curvature and the conic constant of the aspheric equations defining the anterior and posterior optical surfaces. In particular, although such a choice of exact values provides an IOL according to the invention, variations around these exact values remain fully in the scope of the invention. This is additionally commented in the detailed description in view of the FIGS. 5A-C, hereafter introduced. This is why it makes sense to consider "envelops" as margin of uncertainties around the graphs of the two relations $\kappa_{st}(R_{st})$ and $\kappa_{nd}(R_{nd})$ defined by this choice of exact values. According to the invention, these envelops are considered in the form of the above-mentioned intervals, but other kind of envelops can be defined. In particular, according to an independent preferred embodiment of the invention:

$$|\kappa_{st}(R_{st}) - (-40[\mathrm{erf}(0.092R_{st} - 2.29) + 1])| < \frac{|\kappa_{st}(R_{st})|}{p_1} \text{ if } R_{st} > 0;$$

$$|\kappa_{st}(R_{st}) - (0.0621R_{st}^2 - 0.396R_{st} - 11.035)| < \frac{|\kappa_{st}(R_{st})|}{p_2} \text{ if } R_{st} < 0;$$

$$|\kappa_{nd}(R_{nd}) - (0.0989R_{nd}^2 + 1.277R_{nd} + 4.663)| < \frac{|\kappa_{nd}(R_{nd})|}{p_3};$$

(relations noted (*)) wherein, for each $j \in \{1, 2, 3\}$, $p_j$ are numbers, $p_j \geq 10$, and optionally, $p_j=10$, more optionally, $p_j=20$, more optionally $p_j=50$. It will be understood from a skilled person that these relations express that the real conic constants of the first and second surfaces respectively is "close enough" to the conic constants defined by the relations $\kappa_{st}(R_{st})$ and $\kappa_{nd}(R_{nd})$ taking into account all the above-mentioned exact values. By "close enough", it has to be understood that the associated relative deviations are bounded by $1/p_j$ in absolute value. The deviations $1/p_j$ can also realize an evaluation of said interpolation and/or approximation by the two relations $\kappa_{st}(R_{st})$ and $\kappa_{nd}(R_{nd})$ defined by the choice of exact values, and then can vary according to the latter. As non-limitative illustrative example, for the above-mentioned exact values, $p_1=10$, $p_2=15$, $p_3=20$ can be considered. These deviations define additionally another kind of such envelops combined with the above-mentioned intervals. Alternatively, these envelops can be considered alone, in place of the intervals of paragraph [0008] in which the constant real numbers are comprised, in such way to define an alternative invention in the same framework of the present invention. In this case, the relations (*) can be generalized by:

$$|\kappa_{st}(R_{st}) - (A[\mathrm{erf}(BR_{st} + C) + D])| < \frac{|\kappa_{st}(R_{st})|}{p_1} \text{ if } R_{st} > 0;$$

$$|\kappa_{st}(R_{st}) - (aR_{st}^2 + bR_{st} + c)| < \frac{|\kappa_{st}(R_{st})|}{p_2} \text{ if } R_{st} < 0;$$

$$|\kappa_{nd}(R_{nd}) - (fR_{nd}^2 + gR_{nd} + h)| < \frac{|\kappa_{nd}(R_{nd})|}{p_3};$$

wherein a, b, c, A, B, C, D, f, g, h can be of any values disclosed explicitly in this document, in particular in paragraphs [0034]-[0036] and [0070]-[0073], and wherein, for each $j \in \{1, 2, 3\}$, $p_j$ are numbers greater than or equal to 10, and optionally, $p_j=10$, more optionally, $p_j=20$, more optionally $p_j=50$.

Other exact values may be considered as being more faithful with regard to the specific choice of radius of curvature and conic constant for the anterior and posterior optical surfaces. As an example, for an IOL whose optical power is smaller than or equal to 27.5 D, constant real numbers f, g and h are more preferably exactly given by: f=0.1032 and/or g=1.372 and/or h=5.1353. These values are more preferably considered in combination, the terms "and/or" being preferably "and". This is specifically commented hereafter in view of FIG. 5C. As another example, the above-mentioned values B=0.092 and/or C=−2.29 can alternatively be replaced by B=0.081 and/or C=−2.095 (or, optionally, also by the values B=0.085 and/or C=−2.168), providing another approximations curves of particular values chosen for the radius of curvature and the conic constant of the aspheric equations defining the anterior and posterior optical surfaces, to achieve, smoothly with respect to at least a main selection of IOL optical powers, a desired optimized EDOF and MTF. In particular, according to an independent corresponding embodiment of the invention, the relations $$|\kappa_{st}(R_{st}) - (-40[\mathrm{erf}(0.081R_{st} - 2.095) + 1])| < \frac{|\kappa_{st}(R_{st})|}{p'_1} \text{ if } R_{st} > 0;$$

and/or $$|\kappa_{st}(R_{st}) - (0.0621R_{st}^2 - 0.396R_{st} - 11.035)| < \frac{|\kappa_{st}(R_{st})|}{p'_2} \text{ if } R_{st} < 0;$$

and/or $$|\kappa_{nd}(R_{nd}) - (0.0989R_{nd}^2 + 1.277R_{nd} + 4.663)| < \frac{|\kappa_{nd}(R_{nd})|}{p'_3}$$

if the IOL optical power is smaller than or equal to 27.5 D;

$$|\kappa_{nd}(R_{nd}) - (0.1032\ R_{nd}^2 + 1.372\ R_{nd} + 5.1353)| < \frac{|\kappa_{nd}(R_{nd})|}{p'_4}$$

wherein, for each $j \in \{1, 2, 3, 4\}$, $p_j' \geq 10$, preferably $p'_4 > p'_3$, are preferably satisfied. All or part of these last relations can be considered in combination and/or replacement of all or part of associated relations (*).

According to a first preferred embodiment of the invention, the IOL has an optical power strictly smaller than 14 D, and $R_{st} < 0$. In particular, the first surface is then anteriorly concave and posteriorly convex at its vertex. According to a second preferred embodiment of the invention, the IOL has an optical power greater than or equal to 14 D, and $R_{st} > 0$. In particular, the first surface is then anteriorly convex and posteriorly concave at its vertex. In other words, combining these two preferred embodiments, preferably, the IOL optical power is strictly smaller than 14 D if and only if $R_{st} < 0$.

Preferably, according to any of these preferred embodiments, the radius of curvature $R_{st}$ of the first surface depends continuously and regularly on the optical power (on the above-mentioned considered interval of definition of the optical power). Preferentially and independently of these preferred embodiments, the radius of curvature $R_{nd}$ of the second surface depends continuously and regularly on the optical power of the intraocular lens. The continuity and the regularity of the variation of the radius of curvature of each of the optical surfaces is a natural preferred option for implementing the desired technical effect of the invention. It also implies a regularity of the variation of the conic constant of each of the optical surfaces as it is expressed regularly in function of the associated radius of curvature.

In the framework of the invention, at least one of the coefficients of asphericity of at least one of the anterior and posterior optical surfaces equations (preferentially of both optical surfaces equations) is non-zero. The IOL optic is provided with an aspheric design which allows for an extension of the depth of focus thanks to the contribution of these non-zero coefficients of asphericity. According to a preferred embodiment of the invention, the coefficients of asphericity of order smaller than or equal to 10 of the anterior and/or the posterior optical surfaces are non-zero. The contribution of all these non-zero coefficients of asphericity allows to obtain a very high EDOF performance. It induced in particular a full aspheric geometry for anterior and/or the posterior optical surfaces comprising a ring of turning point of curvatures (i.e. inflexion points) at mid optic diameter. Preferably, the coefficients of asphericity are decreasing in absolute value with respect to their order and/or bounded in absolute value by 0.1. More preferably, they follow the relations:

$$0<|\alpha_{10}^{st}|<|\alpha_8^{st}|<|\alpha_6^{st}|<|\alpha_4^{st}|<0.01$$

and/or, preferably and, $$0<|\alpha_{10}^{nd}|<|\alpha_8^{nd}|<|\alpha_6^{nd}|<|\alpha_4^{nd}|<0.01.$$

These coefficients of asphericity correspond to side perturbation of the general form of the aspheric surfaces around their vertex. Preferably, the coefficients of asphericity of order strictly greater than 10 of the anterior and/or the posterior optical surfaces are negligible and/or approximated by and/or equal to zero. In other words, they are substantially equal to zero and preferably equal to zero.

Preferably, the coefficients of asphericity of the anterior and/or posterior optical surfaces depend continuously and regularly on an optical power of the intraocular lens. In particular, preferably, all the parameters (the radius of curvature, the conic constant and the coefficients of asphericity) defining the anterior and/or the posterior optical surfaces depends regularly on the IOL optical power.

As specific embodiments of the invention, it is now provided exact equations for both the anterior and the posterior optical (aspheric) surfaces of an IOL of a selections of predetermined optical powers:

according to a first specific embodiment of the invention, an IOL optical power is 15 D and
$R_{ant}$=79.63 mm and/or $\kappa_{ant}(R_{ant})$=−80.00 and/or
$\alpha_4^{ant}$=−0.0028436 and/or $\alpha_6^{ant}$=0.0011285 and/or
$\alpha_8^{ant}$=0.0003426 and/or $\alpha_{10}^{ant}$=0.0000385 and/or
$R_{post}$=−13.82 mm and/or $\kappa_{post}(R_{post})$=5.95 and/or
$\alpha_4^{post}$=−0.0019988 and/or $\alpha_6^{post}$=0.0012797 and/or
$\alpha_8^{post}$=−0.0004066 and/or $\alpha_{10}^{post}$=0.0000483;

according to a second specific embodiment of the invention, an IOL optical power is 20 D and
$R_{ant}$=21.60 mm and/or $\kappa_{ant}(R_{ant})$=−25.61 and/or
$\alpha_4^{ant}$=−0.0045458 and/or $\alpha_6^{ant}$=0.0024547 and/or
$\alpha_8^{ant}$=−0.0007700 and/or $\alpha_{10}^{ant}$=0.0000865 and/or
$R_{post}$=−15.21 min and/or $\kappa_{post}(R_{post})$=8.10 and/or
$\alpha_4^{post}$=−0.0035812 and/or $\alpha_6^{post}$=0.0025087 and/or
$\alpha_8^{post}$=0.0008240 and/or $\alpha_{10}^{post}$=0.0000988;

according to a third specific embodiment of the invention, an IOL optical power is 25 D and
$R_{ant}$=11.47 mm and/or $\kappa_{ant}(R_{ant})$=−3.67 and/or
$\alpha_4^{ant}$=−0.0050469 and/or $\alpha_6^{ant}$=0.0030927 and/or
$\alpha_8^{ant}$=0.0009930 and/or $\alpha_{10}^{ant}$=0.0001136 and/or
$R_{post}$=−19.47 mm and/or $\kappa_{post}(R_{post})$=17.61 and/or
$\alpha_4^{post}$=−0.0040138 and/or $\alpha_6^{post}$=0.0031780 and/or
$\alpha_8^{post}$=−0.0010891 and/or $\alpha_{10}^{post}$=0.0001352.

For each of the above-mentioned optical power, these explicit data are preferably considered in combination. In the framework of the present document, any explicit data mentioned as geometric parameters for the anterior and the posterior optical surfaces are given for the IOL in dry state. These values can be appreciated with respect to an uncertainty of at most 10% in absolute value, more preferably 5%, given that factor such as the raw biomaterial constituting the IOL and/or manufacturing technics and conditions can impact them. As an example, radii of curvature of these first, second and third specific embodiments, can respectively be replaced by other preferred values as:

$R_{ant}$=86.11 mm, and/or $R_{post}$=−14.00 mm; and/or
$R_{ant}$=22.01 mm, and/or $R_{post}$=−15.42 mm; and/or
$R_{ant}$=11.61 mm, and/or $R_{post}$=−19.88 mm;

without changing the other equation parameters values.

The appearing geometry of the anterior and posterior optical surfaces is now described. Preferentially, according to embodiments of the invention for which the IOL optical power is greater than or equal to 14 D:

an elevation map evaluated on a radial coordinate on the anterior optical surface, taking a plane perpendicular to the optical axis as a zero-elevation plane of reference and taking the optical axis as a reference axis for an elevation evaluation:
  presents a local minimum at the vertex of the anterior optical surface,
  is increasing from the vertex of the anterior optical surface to an edge of this surface;
an elevation map evaluated on a radial coordinate on the posterior optical surface, taking the plane perpendicular to the optical axis as a zero-elevation plane of reference and taking the optical axis as a reference axis for an elevation evaluation, presents:
  a local maximum at the vertex of the posterior optical surface,
  a peripheral local minimum at a positive distance from an edge of the posterior optical surface,
  an inflexion point situated between said local maximum and said peripheral local minimum,
  and:
  is decreasing from the vertex of the posterior optical surface to the peripheral local minimum,
  is increasing from the peripheral local minimum to an edge of this posterior optical surface.

Preferentially, according to embodiments of the invention for which the IOL optical power is strictly greater than 12 D and strictly smaller than 14 D:

an elevation map evaluated on a radial coordinate on the anterior optical surface, taking a plane perpendicular to the optical axis as a zero-elevation plane of reference and taking the optical axis as a reference axis for an elevation evaluation, presents:
  a local maximum at the vertex of the anterior optical surface,
  a peripheral local minimum at a positive distance from an edge of the anterior optical surface,
  an inflexion point situated between said local maximum and said peripheral local minimum,
  and:
  is decreasing from the vertex of the anterior optical surface to said peripheral local minimum,
  is increasing from said peripheral local minimum to an edge of the anterior optical surface.

an elevation map evaluated on a radial coordinate on the posterior optical surface, taking the plane perpendicular to the optical axis as a zero-elevation plane of reference and taking the optical axis as a reference axis for an elevation evaluation, presents:
    a local maximum at the vertex of the posterior optical surface,
    a peripheral local minimum at a positive distance from an edge of the posterior optical surface,
    an inflexion point situated between said local maximum and said peripheral local minimum,
and:
    is decreasing from the vertex of the posterior optical surface to the peripheral local minimum,
    is increasing from the peripheral local minimum to an edge of this posterior optical surface.

In particular, in this case, both elevation maps of the anterior and posterior optical surfaces have a similar profiles.

Preferentially, according to embodiments of the invention for which the IOL optical power is smaller than or equal to 12 D:
    an elevation map evaluated on a radial coordinate on the anterior optical surface, taking a plane perpendicular to the optical axis as a zero-elevation plane of reference and taking the optical axis as a reference axis for an elevation evaluation:
        presents a local maximum at the vertex of the anterior optical surface,
        is decreasing from the vertex of the anterior optical surface to an edge of this surface;
    an elevation map evaluated on a radial coordinate on the posterior optical surface, taking the plane perpendicular to the optical axis as a zero-elevation plane of reference and taking the optical axis as a reference axis for an elevation evaluation:
        presents a local maximum at the vertex of the posterior optical surface,
        is decreasing from the vertex of the posterior optical surface to an edge of this surface.

In particular, in this case, both elevation maps of the anterior and posterior optical surfaces have similar profiles.

These geometrical properties of the anterior and posterior optical surfaces described in the three preceding paragraphs are due to the asphericity of these surfaces governed by the (aspheric) equation for these surfaces, in particular for the preferred embodiments of the invention for which the coefficients of asphericity of order smaller than or equal to 10 of the anterior and the posterior optical surfaces are non-zero. These geometrical properties provide the IOL with high optical quality (described by a high MFT) and result in the EDOF only depending marginally on the optical power, the aperture and the corneal spherical aberrations.

According to a preferred embodiment of the invention, the anterior and the posterior optical surfaces are cut from a hydrophobic raw biomaterial of refraction index between 1.40 and 1.65. Preferably, this raw biomaterial is glistening-free. Glistenings also called fluid-filled microvacuoles form within certain IOL materials and can develop following IOL implantation in various shapes, sizes, and density. Some IOLs on the market develop glistenings after implantation which can impact on the quality of vision. Preferably, the raw biomaterial contains an UV blocker (in the range strictly smaller than 400 nm) and/or a yellow chromophore to reduce transmittance of potentially phototoxic light in the violet-blue range (between 400 and 500 nm). Preferably, the refraction index is equal to 1.52.

According to a preferred embodiment of the invention, the anterior and the posterior optical surfaces are separated by an internal body of a predetermined central thickness, measured along the optical axis, and comprises between 0.30 and 0.70 mm. Advantageously, this central thickness allows to attach flexible haptics at a periphery of an optic consisting of the internal body and the anterior and posterior optical surfaces.

According to a preferred embodiment of the invention, both the anterior and the posterior optical surfaces have a diameter, measured perpendicularly to the optical axis, comprises between 4.70 and 5.00 mm, preferably between 4.80 and 4.95 mm, more preferably between 4.85 and 4.91 mm. This diameter refers preferably to the so-called clear optic. It is targeted around the value 5 mm during the manufacture of the IOL optic (or central optic part). Nevertheless, as it is described hereafter, the junction between haptics of the IOL and its optic has to be optimized which generates a potential reduction of the clear optic which is more generally about 4.85 mm after the IOL manufacture. In particular, the geometry of the anterior and posterior optical surfaces stops at edges of the IOL optic defined by its junction with haptics, referring to the "edge of these optical surfaces".

According to an embodiment of the invention, a combined optical refraction of the anterior and the posterior optical surfaces with a cornea model (anteriorly external to the IOL) provides a continuous and regular map of optical power comprising a central global maximum (dioptric power) (which can be associated to closer distances vision, e.g. intermediate distance) along the optical axis surrounded by a spread central region of lower optical power (for further distances vision, e.g. far distances). The term "lower" has to be interpreted with respect to the central global maximum (peak power). The "cornea model" is for example an "average cornea model", i.e. a cornea model providing a 0.28 μm (±0.2 μm) corneal spherical aberration at 5.15 mm aperture, at IOL plane, and for an average human eye. This average cornea model is completely standard and very well-known by a skilled person. It is denoted by ISO2. Preferably, the central region is "spread" in the sense that it is spread on about a half of a diameter of the anterior and the posterior optical surfaces. Preferably, this central region is surrounded by a first ring of points of the map that are either inflexion points or local minima of optical power. Optionally, the map further comprises a second ring of points that are local maxima of optical power, said second ring surrounding said first ring. This regular map is shown in the FIGS. 10A-B, hereafter introduced. This naturally results in an EDOF provided by the IOL. It is advantageous to point out that the map of optical power is regular. In particular, the IOL provides a patient with a high optical quality for various distances simultaneously, without abrupt change of optical power along the optic susceptible to cause side effects such as scattered light, halos or glare.

According to a very preferred embodiment of the invention, the intraocular lens according to the invention comprises:
    a central optic part (or optic) whose:
        an anterior surface is the anterior optical surface, and
        a posterior surface is the posterior optical surface;
    a plurality of flexible haptics connected to the central optic part, and configured for stabilizing the intraocular lens into a capsular bag of an aphakic eye.

The term "central" refers to the extension of the optic around and/or centered on the optical axis. The term "central" is preferably not referring to a part of the IOL optic and preferably consists in the whole optic part of the IOL optic. Preferably, the first surface is the anterior optical surface.

Preferably, the IOL comprises four closed flexible haptics, each forming a loop based on the central optic part. Preferentially, a haptic thickness measured along the optical axis is comprised between 0.20 and 0.50 mm, more preferably, it is equal to 0.34 mm. Preferably, the haptics are made of a same hydrophobic raw biomaterial as the central optic part. Preferably, the haptics are cut by a milling machine. Preferably, the plurality of flexible haptics consists in four closed flexible haptics, each forming a loop based on the central optic part. These four closed flexible haptics are preferably arranged symmetrically around the central optic part, along the diagonals of a rectangle, provide four contact points, allowing maximized contact angle between the haptics and the surrounding ocular tissues when the IOL is in a normal use in an aphakic eye. As a consequence, controlled compensation of capsular bag size variations is advantageously possible through radial deformation of the haptics.

Preferably, a distance, measured along the optical axis, between a flexible haptic (anterior) apex and a principal (or median) optical plane of the central optic part depends continuously and regularly on an optical power of the intraocular lens. It is advantageous and important to take into account this distance and to compute it as a function of the IOL optical power. In fact, as discussed above, the aspheric geometry of the anterior and the posterior optical surfaces varies regularly depending on the IOL optical power. This implies that the principal optical plane is not constant and changes in position in function of the IOL optical power. It is then of a major importance to also adapt the connection between haptics and the central optic part in position parallel to the optical axis (creating then an offset) and in angle between the principal optical plane and a proximal part of the haptics at their connection with the central optical part. This is as important as to adapt correctly legs of glasses to a body. Advantageously, the present invention proposes to take this into account through the above-mentioned distance. Moreover, the haptics geometry and the distance are preferably also chosen for ensuring the IOL stability parallel to the optical axis when it is implanted in a capsular bag of an aphakic eye. Preferably, it is bounded by 0.45 mm and is continuously increasing for increasing optical powers. This distance in function of the IOL optical power is additionally commented in the detailed description, in view of FIGS. 12A-B, hereafter introduced.

In other words, according to a preferred embodiment of said very preferred embodiment of the invention, a distance, measured along the optical axis, between a flexible haptic (anterior) apex and a principal (or median) optical plane of the central optic part corresponds to an image of an optical power of the intraocular lens by a continuous regular function, continuously increasing for increasing optical powers, and bounded by 0.45 mm, in such a way that said principal optical plane is (longitudinally) stable parallel to the optical axis when the intraocular lens is implanted in a capsular bag of an aphakic eye. This distance and the related advantages are fully part of the invention. In particular, the present invention also provides an intraocular lens (IOL) comprising:

a central optic part (or optic) comprising:
an aspheric anterior optical surface, and
an aspheric posterior optical surface;
a plurality of flexible haptics connected to the central optic part;

wherein a distance, measured along the optical axis, between a flexible haptic apex and a principal optical plane of the central optic part depends continuously and regularly on an optical power of the IOL. Any of the embodiment and/or advantage of the IOL of paragraph [0008] previously described can be extended to this other IOL according to the invention.

According to a preferred embodiment of the present invention, the IOL is shape invariant under a rotation of 180° around the optical axis. It is then easier to insert and manipulate the IOL in an eye as its shape and, in particular, the form of the haptics, naturally follows potential position adjustment in rotation at the time of surgery.

The present invention also provides a manufacture method of an intraocular lens according to the invention comprising the steps:
(a) modeling an optic having aspheric optical surfaces profile pattern;
(b) calculating a refractive efficiency distribution for light propagating through the modelled optic;
(c) selecting aspheric optical surfaces profile parameters according to the calculated refractive efficiency distribution, so as to achieve desired refractive efficiencies; and
(d) forming the modeled optic with the selected parameters from a raw biomaterial.

The manufacture method according to the invention provides IOLs easily with optimized parameters for an improved quality vision at far and intermediate distances. Preferably, the aspheric optical surfaces profile parameters selected in step (c) depend continuously and regularly on an optical power of the intraocular lens. For each surface, theses parameters preferably comprise (more preferably consist in) the radius of curvature and the conic constant evaluated at the surface vertex, and the coefficient of asphericity. The embodiments and advantages of the IOL according to the invention are transposed mutatis mutandis to the method according to the invention. In particular, preferentially, step (c) is performed in view of a table of parameters comprising optimized aspheric surfaces profile parameters for each desired IOL optical power associated with the desired refractive efficiencies, those parameters being determined very easily in view of the predetermined relations $\kappa_{st}(R_{st})$ and $\kappa_{nd}(R_{nd})$. Preferably and specifically, a conic constant $\kappa_{st}$ of a (the) first surface among these aspheric optical surfaces, evaluated at its vertex, is selected in step (c) in function of a radius of curvature $R_{st}$ of the first surface evaluated at this vertex by the relation $$\kappa_{st}(R_{st}) = \begin{cases} aR_{st}^2 + bR_{st} + c & \text{if } R_{st} < 0 \\ A[\text{erf}(BR_{st} + C) + D] & \text{if } R_{st} > 0 \end{cases}$$

where erf denotes a Gauss error function, and where a, b, c, A, B, C, D are constant real numbers; and a conic constant $\kappa_{nd}$ of a (the) second surface among these aspheric optical surfaces, evaluated at its vertex, is selected in step (c) in function of a radius of curvature $R_{nd}$ of the second surface evaluated at this vertex by the relation $$\kappa_{nd}(R_{nd}) = fR_{nd}^2 + gR_{nd} + h$$

where f, g, h are constant real numbers. All embodiments and advantages of the IOL according to the invention concerning these relations and/or the constant real numbers a, b, c, A, B, C, D, f, g, h apply mutatis mutandis to this preferred embodiment of the manufacture method according to the invention. As another independent preferred embodiment of this manufacture method for an IOL as described in paragraph [0053], this method comprises of the step of selecting a distance, measured along the optical axis, between a flexible haptic apex and a principal optical plane of the central optic part, in function of an optical power of the intraocular lens as an image of the latter by a continuous and regular function, continuously increasing for increasing optical powers, and bounded by 0.45 mm, so as to achieve a desired longitudinal stability of the principal optical plane parallel to the optical axis when the intraocular lens is implanted in a capsular bag of an aphakic eye.

BRIEF DESCRIPTION OF THE FIGURES

Other characteristics and advantages of the present invention will appear on reading the following detailed description, for the understanding of which, it is referred to the attached figures where:

FIG. 1 illustrates a simplified planar representation of an anterior surface of an IOL according to a preferred embodiment of the invention;

FIG. 2 illustrates a simplified comparison of light focusing by a monofocal lens with light focusing by the IOL according to the invention;

Figure 9A:
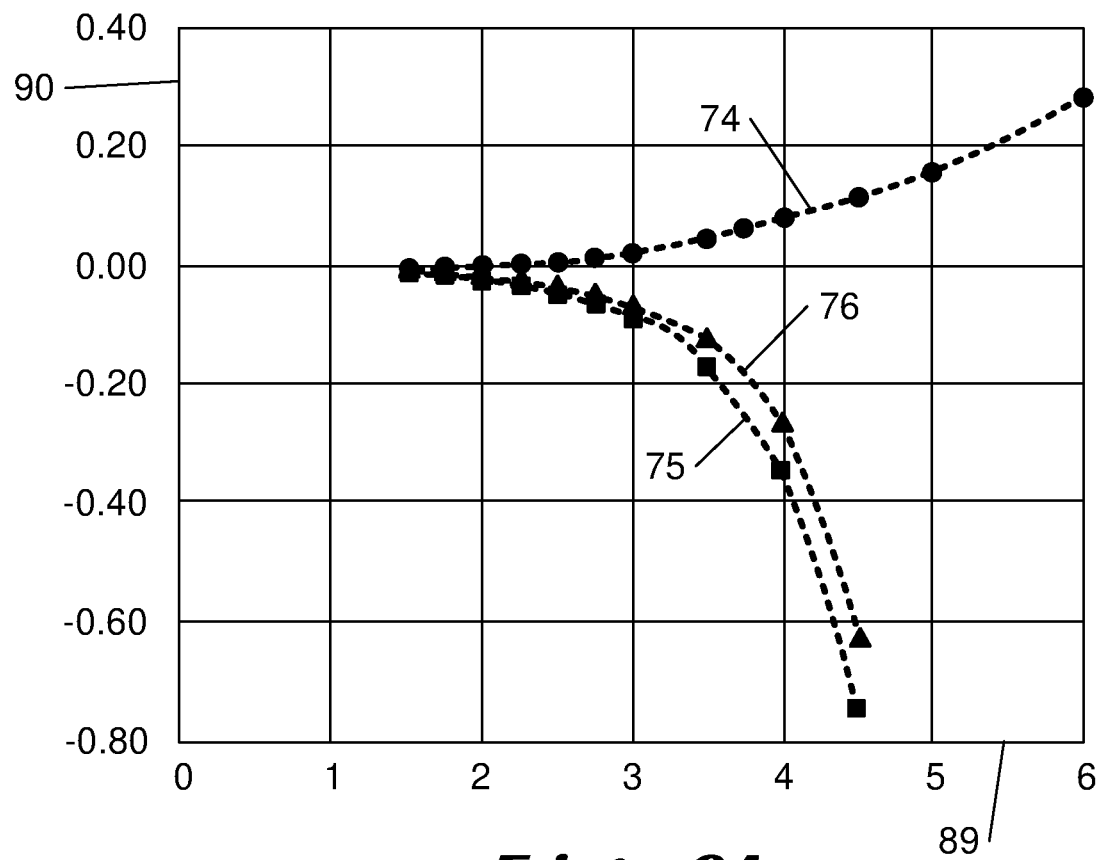
Figure 9B:
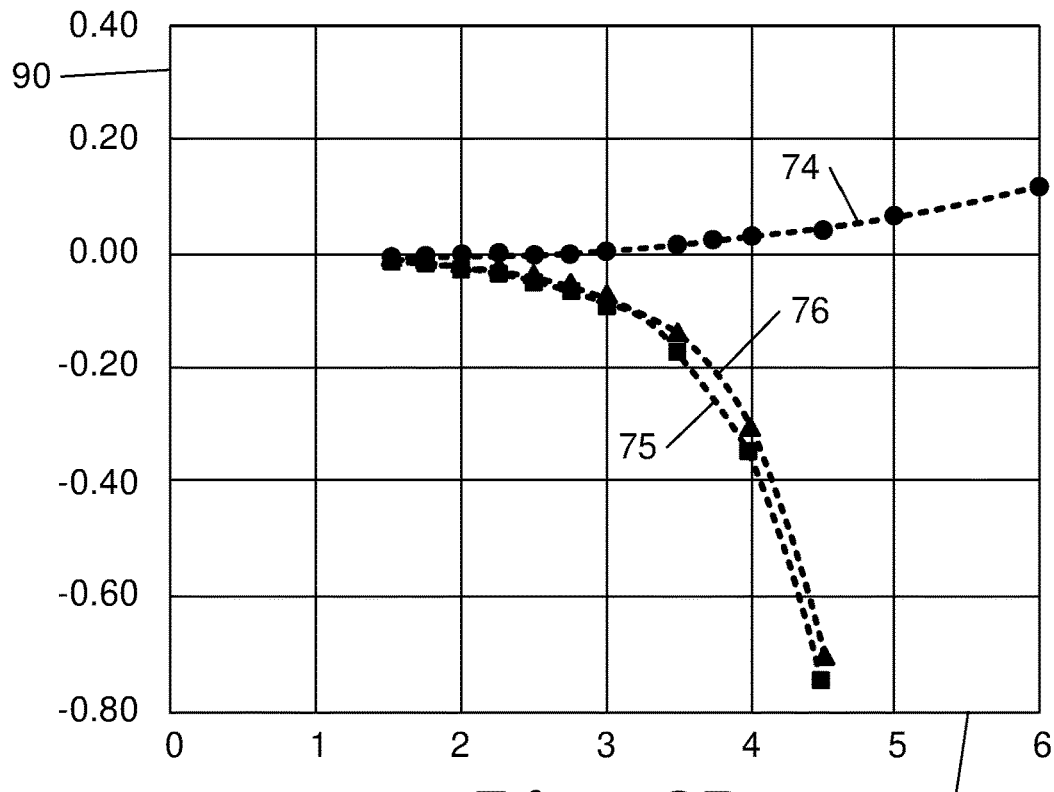
Figure 9C:
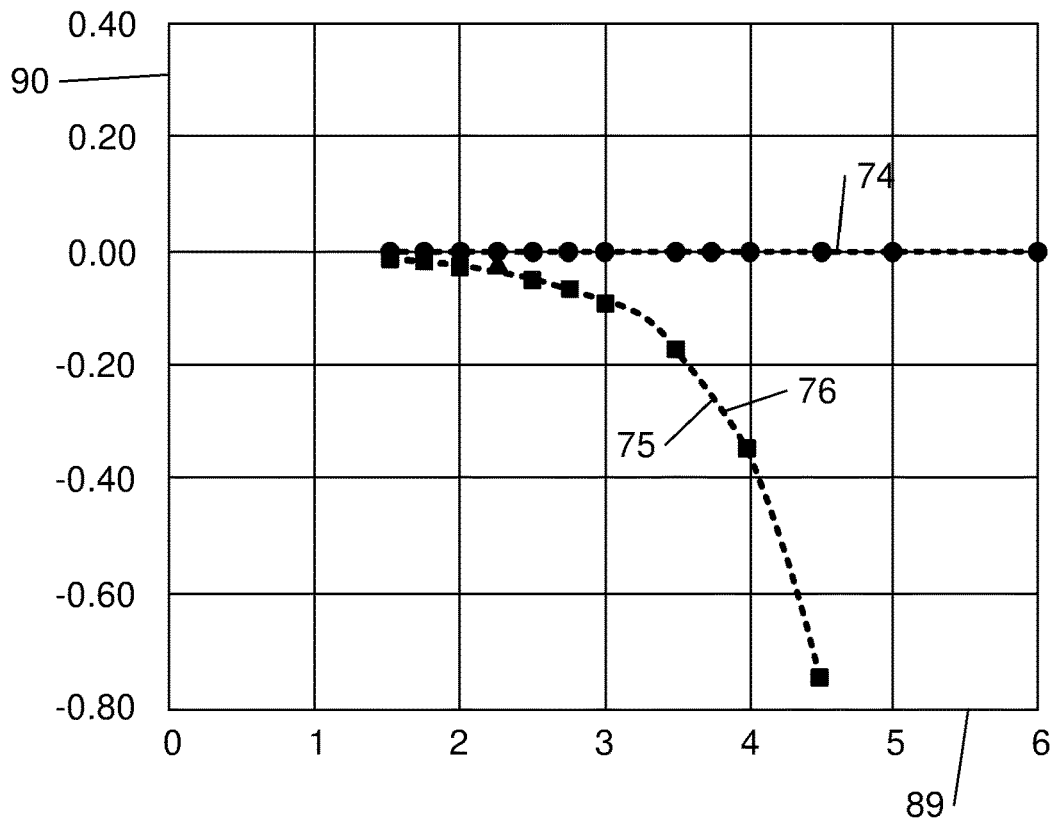
Figure 10B:
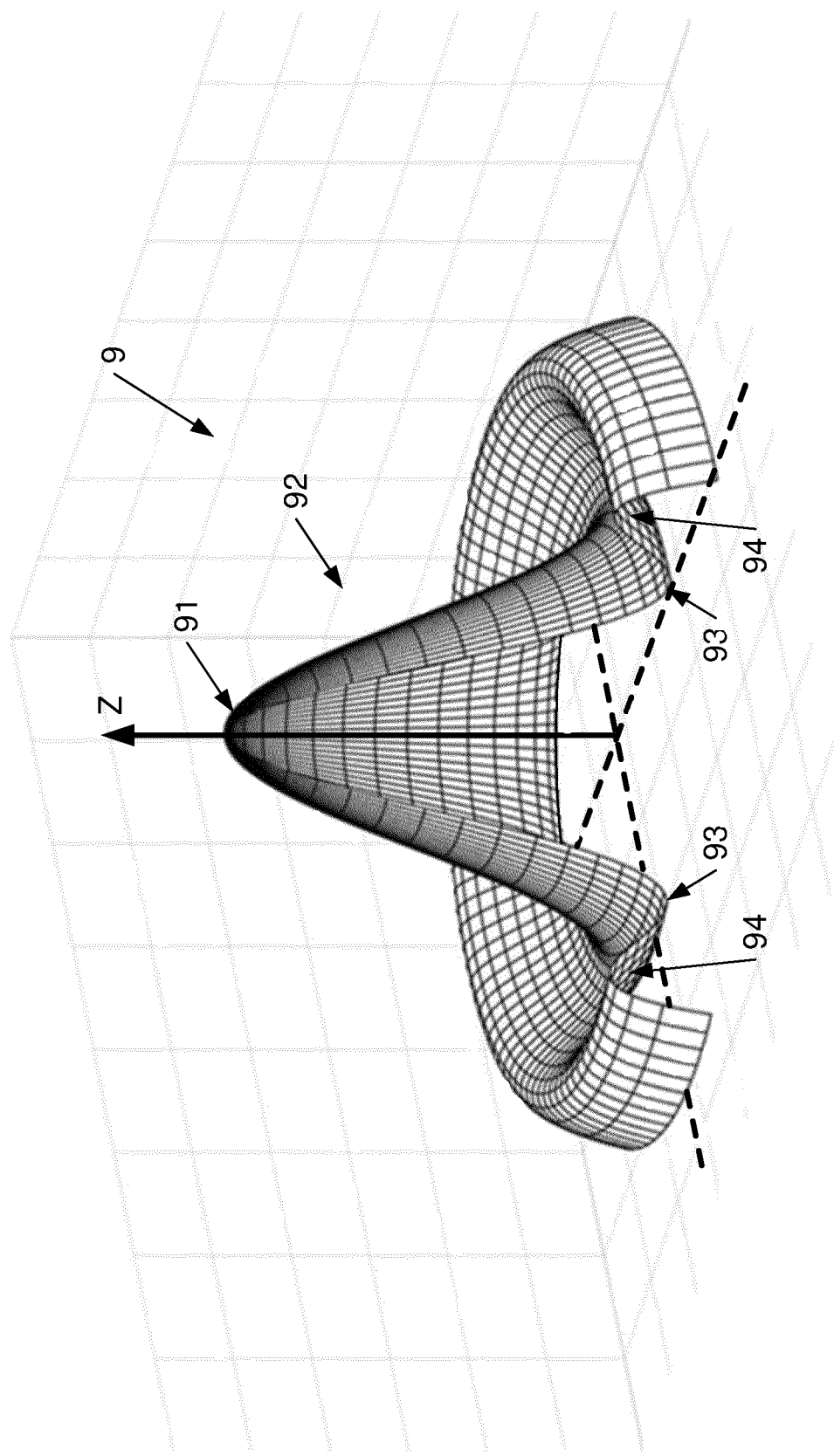
Figure 12A:
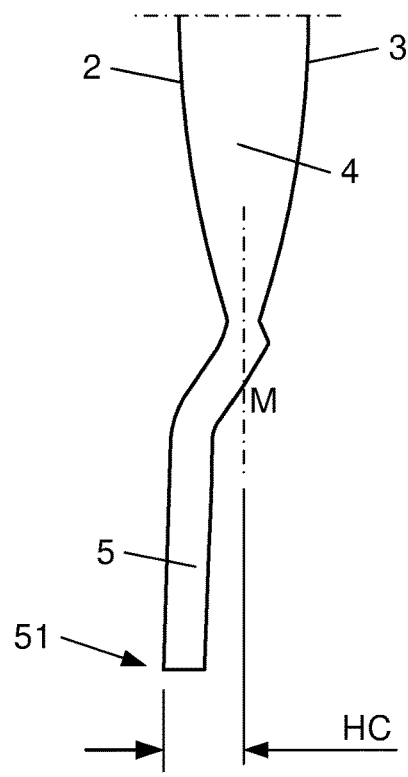
Figure 12B:
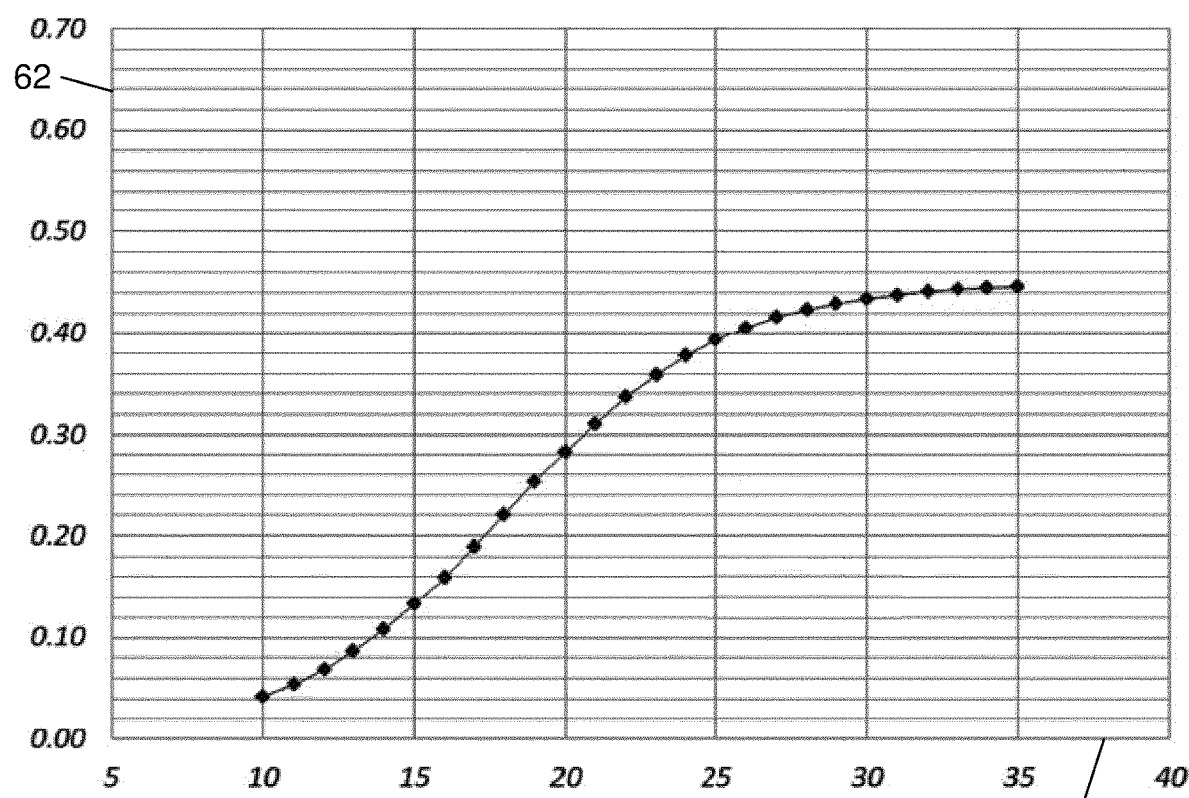
Figure 13:
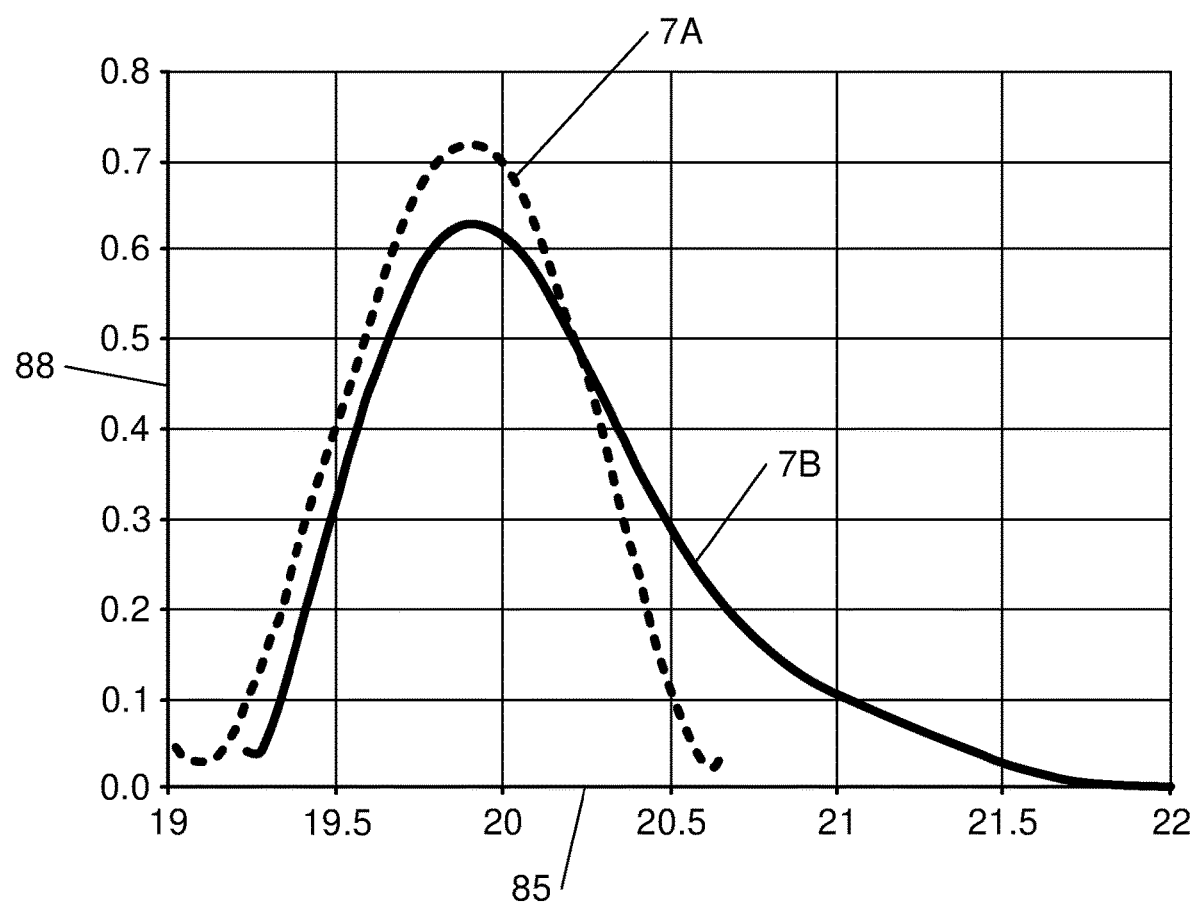

each of FIG. 9A-C illustrates graphic representations of (fourth order) spherical aberrations in function of an aperture, for a cornea model, for an IOL according to a preferred embodiment of the invention, and for the combination of these two;

FIGS. 10A-B illustrate maps of optical power obtained by combined optical refraction of the anterior and the posterior optical surfaces according to embodiments of the invention with a cornea model;

FIGS. 11A-C illustrate simplified sectional representations of IOLs according to preferred embodiments of the invention;

FIG. 12A illustrates a connection between a haptic and the central optic part of an IOL according to an embodiment of the invention;

FIG. 12B illustrates a graphic representation of the distance measured along the optical axis, between a flexible haptic apex and a principal optical plane of an IOL central optic part according to preferred embodiments of the invention, in function of the IOL optical power;

FIG. 13 illustrates graphic representations of measurements on an optical bench of a through focus MTF of both an IOL according to a preferred embodiment of the invention and a standard monofocal IOL.

The drawings in the figures are not scaled. Generally, similar elements are assigned by similar references in the figures. In the framework of the present document, identical or analogous elements may have the same references. Moreover, the presence of reference numbers in the drawings cannot be considered to be limiting, comprising when these numbers are indicated in the claims.

Nevertheless, the FIGS. 5A-C, 6A-C, 7, 8 and 9A-C that are illustrating graphic representations are deemed to reproduced faithfully data of measurements and/or interpolation (or approximation) curves in such a way that these figures disclose each value or intervals of values derivable from these graphic representations.

DETAILED DESCRIPTION OF SPECIFIC EMBODIMENTS OF THE INVENTION

This part presents a detailed description of specific preferred embodiments of the invention. Those are described with references to figures, but the invention in not limited by these references. In particular, the drawings or figures described below are only schematic and are not limiting in any way. The present detailed description will only refer to the preferred embodiment of the invention for which the first and second surfaces are respectively the anterior and posterior optical surfaces. Then, for reading facility, index st and nd are respectively replaced by the index ant and post. In addition, the reference number 2 (resp. 3) is used in the detailed description and the figures for designating the anterior (resp. posterior) optical surface (which then corresponds to the first (resp. second) surface).

As illustrated in the following figures, the present invention provides a refractive intraocular lens (IOL) 1 with extended depth of focus (EDOF) comprising a single aspheric anterior optical surface 2 and a single aspheric posterior optical surface 3 extending radially outward relative to an optical axis Z, and rotationally symmetrically around this optical axis Z. This optical axis Z is directed from the anterior optical surface 2 to the posterior optical surface 3, or, in other words, from a global anterior surface of the IOL 1 to a global posterior surface of the IOL 1. The reference numbers 21 and 31 denote the vertex of the optical surfaces 2 and 3 respectively.

Figure 4:
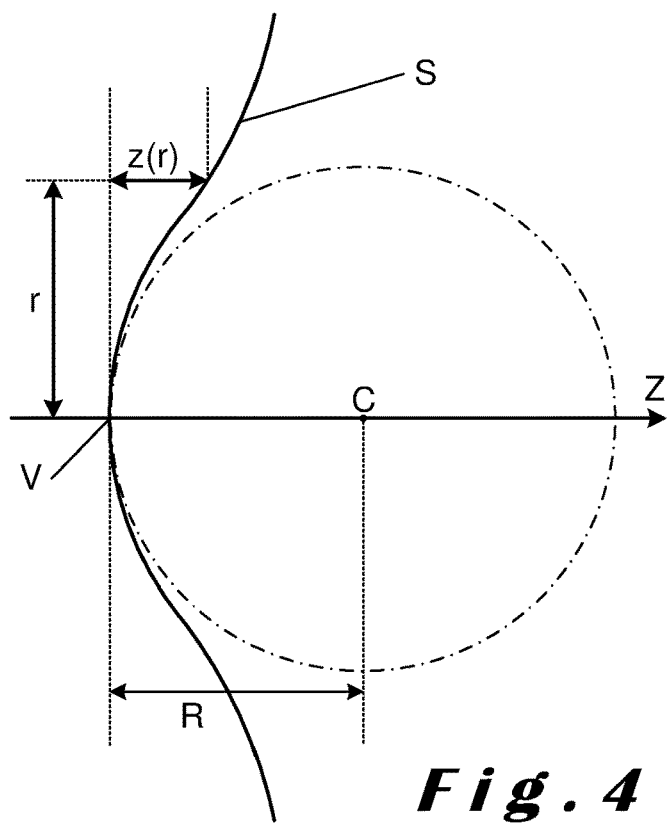
FIG. 4 illustrates a schematic view of an aspheric surface.

Each of the optical surfaces 2 and 3 are defined by a single equation of the form $$z(r) = \frac{r^2}{R\left(1 + \sqrt{1 - \frac{(1+\kappa)r^2}{R^2}}\right)} + \sum_{i \geq 2} \alpha_{2i} r^{2i}$$

as described in the disclosure of the invention. For an arbitrary aspheric surface (for example, the anterior 2 or the posterior 3 optical surface) denoted more generally by S, which comprises a vertex denoted more generally by V, the FIG. 4 illustrated how is defined such an aspheric surface from an equation of this form. This figure illustrates an osculating circle of a section of the surface S (defining then a curve) comprising the optical axis Z, at the vertex V. In particular, this circle approximates the section of the surface S around the vertex V. The center of curvature C of this circle lies on the optical axis Z. This circle has a radius corresponding to the so-called radius of curvature R of the section of the surface S evaluated at the vertex V. In the embodiment illustrated in FIG. 4, the conventional sign for this radius of curvature R is positive given that the component, measured along the optical axis Z, of the displacement (vector) from the vertex V to the center of curvature C is positive. In fact, this displacement (vector) is directed both in the same direction and sense as the optical axis Z. It is known by a skilled person that a conic constant κ of the section of the surface S, evaluated at the vertex V, defined a global deviation (for example, a hyperbolic, parabolic or elliptic profile) of the section of the surface S from the osculating circle. These notions of radius of curvature R and conic constant κ directly extend to the surface S when evaluated at the vertex V given that an aspheric surface is rotationally symmetric around the optical axis Z, at least locally in a neighborhood of the vertex V. In particular, the radius of curvature R correspond then to a radius of an osculating sphere evaluated at the vertex V. For each i≥2, $\alpha_{2i}$ is a real coefficient (so called coefficient of asphericity) of order 2i of the surface S. These coefficients correspond substantially to (side) variations from the surface as defined from the radius of curvature R and the conic constant κ. Depending on all these parameters R, κ, $\alpha_4$, $\alpha_6$, $\alpha_8$, . . . the equation defines the surface S by expressing a data z(r) as a function of a radial variable r, both illustrated in FIG. 4. The data z(r) corresponds to the component, measured along the optical axis Z, of a displacement (vector) from the vertex V to any point of the surface at a radius r from the optical axis Z. Equivalently, the data z(r) corresponds to the Z-component of a vector VP where P is any point of the surface S at a radius r from the optical axis Z. Considering polar local coordinates (r, z) on the surface S, also equivalently, the data z(r) corresponds to the coordinate along the optical axis Z of a point of the surface S whose radial coordinate is r (counted from the vertex V). The vertex V corresponds generally to the point (r=0; z(r)=0). In the embodiment shown in FIG. 4, the data z(r) is positive because this displacement (vector) is directed in the same direction and sense as the optical axis Z. In this case, the surface S is anteriorly convex (and posteriorly concave). The FIG. 4 was described as a very general illustration of the above-mentioned equation for aspheric surfaces. It is not limitative to the exact form of the claimed anterior 2 and posterior 3 optical surfaces, their concavity or convexity, the sign of their radius of curvature $R_{ant}$ and $R_{post}$, or the sign of their data z(r).

As illustrated in FIG. 1, the IOL 1 according to the invention comprises a central optic part 4 (or optic) whose an anterior surface consists on the anterior optical surface 2, and whose posterior surface consists on the posterior optical surface 3. The IOL 1 also comprises four closed flexible haptics 5 (in the form of mouse ear), each forming a loop based on and connected to the central optic part 4. As explained in the disclosure of the invention, these haptics 5 are specifically arranged for stabilizing the IOL 1 into a capsular bag of an aphakic eye when the IOL 1 is in an implanted state. A circular extension 52 of the haptics 5 extend around the central optic part 4 for securing the latter. A diameter d of the central optic part 4, measured perpendicularly to the optical axis Z, is comprised between 4.70 and 5.00 mm, preferably it is 4.85 mm. A diameter d' of the central optic part 4 surrounded by the extension 52, measured perpendicularly to the optical axis Z, is comprised between 5.65 and 6.10 mm. Preferably, the diameter d' is comprised between 5.90 and 6.10 mm, more preferably it is 6.00 mm, if the optical power of the IOL 1 is strictly smaller than 25 D. Preferably, the diameter d' is comprised between 5.65 and 5.85 mm, more preferably it is 5.75 mm, if the optical power of the IOL 1 is greater than or equal to 25 D. A diameter d" of the IOL 1 (comprising then the central optic part 4, the extension 52 and the haptics 5), measured perpendicularly to the optical axis Z, is comprised between 10.55 and 11.20 mm. Preferably, the diameter d" is comprised between 10.80 and 11.20 mm, more preferably it is 11.00 mm, if the optical power of the IOL 1 is strictly smaller than 25 D. Preferably, the diameter d" is comprised between 10.55 and 10.95 mm, more preferably it is 10.75 mm, if the optical power of the IOL 1 is greater than or equal to 25 D. Advantageously, the haptics 5 design is adapted in function of the IOL optical power. The flexibility of the haptics 5 deduced from their low thickness (between 0.30 and 0.40 mm, measured along the optical axis Z) and their position around the central optic part 4 as illustrated in FIG. 1 allow them to deform radially for compensating of capsular bag size variations when the IOL 1 is in an implanted state.

The advantageous aspheric geometry of both the anterior 2 and posterior 3 optical surfaces of the IOL 1 according to the invention provides an EDOF. As illustrated in FIG. 2, the IOL 1 focusses light on an "extended" focal point, while a standard monofocal IOL 1' focusses light on a single focal point FP. The monofocal IOL 1' provides a quality vision for selected far distances around the focal point FP, but not for near nor intermediate distances away from this focal point FP. The IOL 1 according to the invention advantageously allows for an (asymmetric) extension of this focal point FP towards closer distances in order to create an EDOF providing a globally better quality vision for a wide range of intermediate and far distances.

For obtaining this EDOF, the IOL 1 according to the invention comprises an anterior 2 and a posterior 3 optical surfaces that are both aspheric. The FIGS. 3A-D illustrate sectional profiles (comprising the optical axis Z) of the anterior 2 and posterior 3 optical surfaces for four different optical power: 10 D (in FIG. 3A), 15 D (in FIG. 3B), 20 D (in FIG. 3C) and 35 D (in FIG. 3D). For each of these figures, the axis 81 and 82 define a Cartesian coordinate system for defining the position of points of the anterior 2 and a posterior 3 optical surfaces in a plane in which the section profiles are illustrated. Each of the axis 81 and 82 is graduated in mm. The axis 81 allows to measure positions along the optical axis Z. The axis 82 allows to measure positions perpendicularly to the optical axis Z. The axis 81 and 82 intersect at the vertex 21 of the anterior surface 2. As the diameter d of the central optic part 4, measured perpendicularly to the optical axis Z, is comprised between 4.70 and 5.00 mm, it appears that the sectional profiles illustrated in FIGS. 3A-D are more expended than the anterior 2 and a posterior 3 optical surfaces finally really designed and cut for the IOL 1.

Figure 3D:
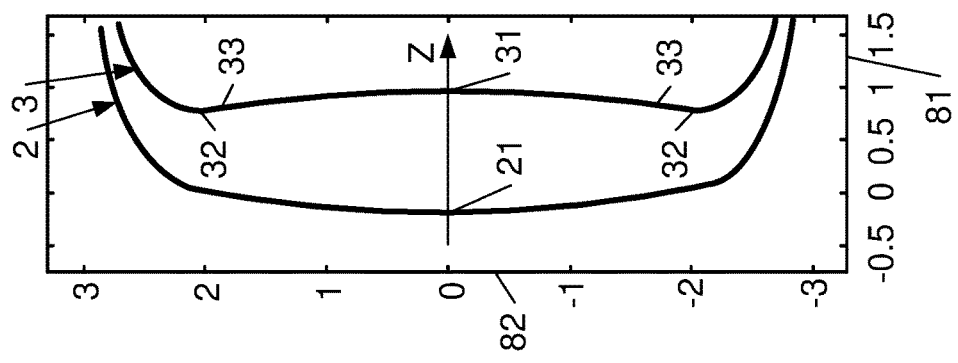
FIGS. 3A-D illustrate sectional views of the anterior and posterior optical surfaces of an IOL according to preferred embodiments of the invention.
Figure 3C:
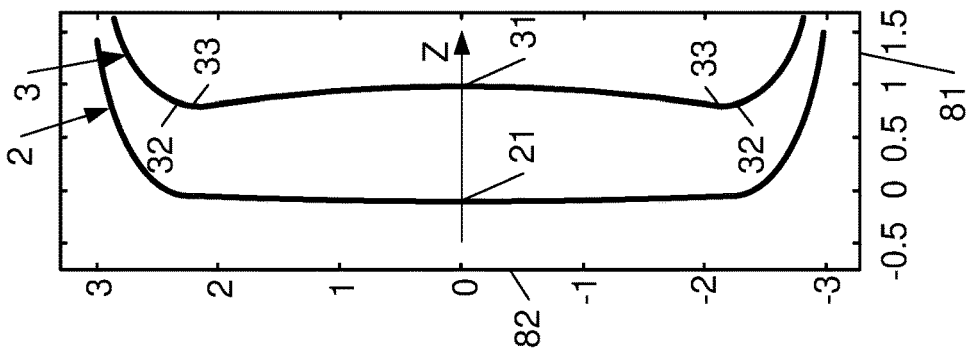
Figure 3B:
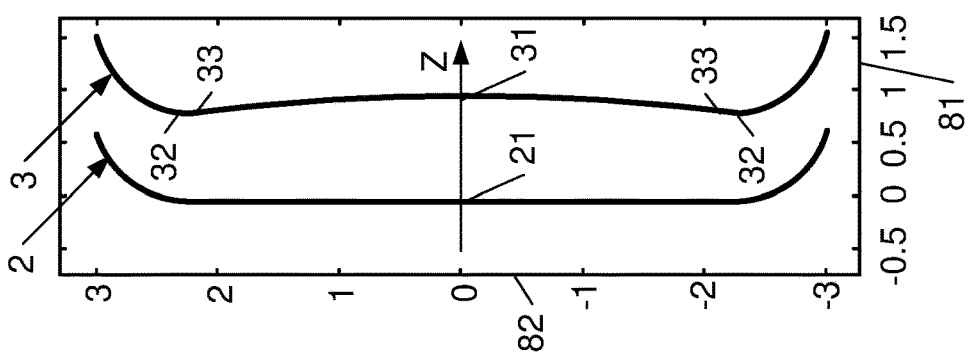
Figure 3A:
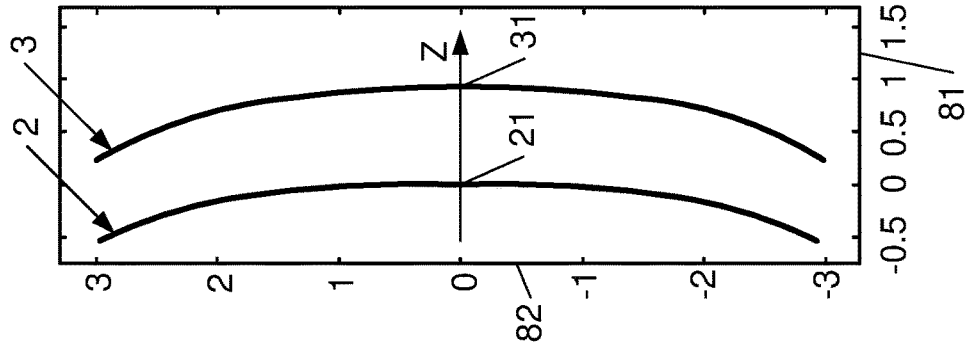

The optical surfaces 2, 3 deduced from FIG. 3A define a concave-convex IOL profile. The anterior optical surface 2 is anteriorly concave while the posterior optical surface 3 is posteriorly convex. In particular, both the radius of curvature $R_{ant}$ and $R_{post}$ of the anterior 2 and the posterior 3 optical surfaces evaluated at their respective vertex 21 and 31 are negative, and both the conic constant $\kappa_{ant}$ and $\kappa_{post}$ of the anterior 2 and the posterior 3 optical surfaces evaluated at their respective vertex 21 and 31 are positive. An elevation map evaluated on a radial coordinate on any of the anterior 2 or the posterior 3 optical surfaces, taking a plane perpendicular to the optical axis Z as a zero-elevation plane of reference and taking the optical axis Z as a reference axis for an elevation evaluation:
- presents a local maximum at its vertex 21 or 31,
- is decreasing from its vertex 21 or 31 to an edge (in the limit of the finally cut optical surface 2 or 3, whose dimensions are associated with the diameter d) of the optical surface 2 or 3.

The optical surfaces 2, 3 deduced from FIGS. 3B-D define a bi-convex IOL profile. The anterior optical surface 2 is anteriorly convex while the posterior optical surface 3 is posteriorly convex. The radius of curvature $R_{ant}$ of the anterior optical surface 2 evaluated at its vertex 21 is positive, the radius of curvature $R_{post}$ of the posterior optical surface 3 evaluated at its vertex 31 is negative, the conic constant $\kappa_{ant}$ of the anterior optical surface 2 evaluated at its vertex 21 is negative, and the conic constant $\kappa_{post}$ of the posterior optical surface 3 evaluated at its vertex 31 is positive. An elevation map evaluated on a radial coordinate on the anterior optical surface 2, taking a plane perpendicular to the optical axis Z as a zero-elevation plane of reference and taking the optical axis Z as a reference axis for an elevation evaluation:
- presents a local minimum at its vertex 21,
- is increasing from its vertex 21 to an edge (in the limit of the finally cut anterior optical surface 2, whose dimensions are associated with the diameter d) of the anterior optical surface 2.

An elevation map evaluated on a radial coordinate on the posterior optical surface 3, taking the plane perpendicular to the optical axis Z as a zero-elevation plane of reference and taking the optical axis Z as a reference axis for an elevation evaluation, presents:
- a local maximum at its vertex 31,
- a peripheral local minimum 32 at a positive distance from an edge (in the limit of the finally cut posterior optical surface 3, whose dimensions are associated with the diameter d) of the posterior optical surface 3,
- a inflexion point 33 situated between the local maximum and the peripheral local minimum 32, and:
- is decreasing from its vertex 31 to the peripheral local minimum 32,
- is increasing from the peripheral local minimum 32 to an edge of the posterior optical surface 3.

Given that the elevation map is evaluated on a radial coordinate on the posterior optical surface 3, its reading on the points of the whole posterior optical surface 3 (and not on a radial coordinate) defines a ring of such peripheral local minimum 32 and a ring of inflexion points 33 about at mid optic diameter. Such inflexion points 33 correspond to turning points of curvature where the posterior optical surface 3 (as illustrated in FIGS. 3B-D) changes from concave to convex or from convex to concave. More specifically, the posterior optical surface 3 is posteriorly convex around the vertex 31 and posteriorly concave around the ring of peripheral local minimum 32.

Although the anterior 2 and posterior 3 optical surfaces clearly present curvature variation, it has to be pointed out that both the anterior 2 and posterior 3 optical surfaces are smooth, continuous and regular. They do not present any breaking point or abrupt zonal limitation.

Figure 5A:
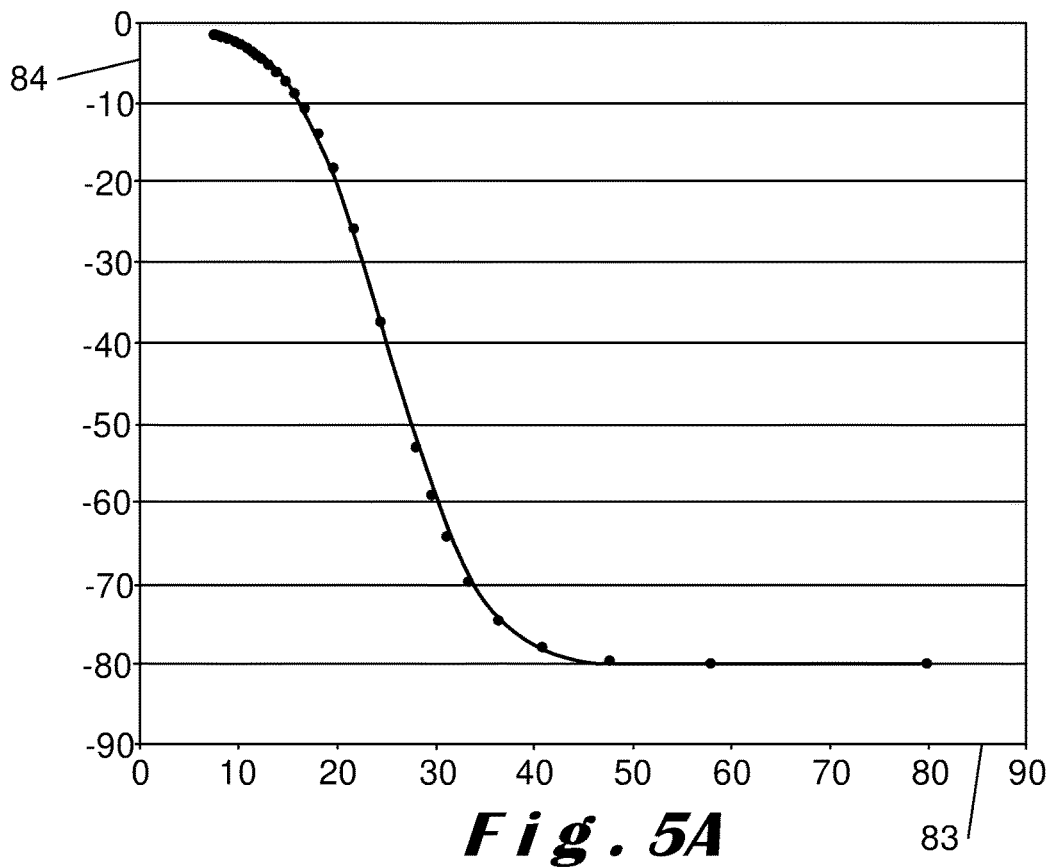
FIG. 5A illustrates a graphic representation of the conic constant of the first surface according to preferred embodiments of the invention, defined in function of its radius of curvature when the latter is positive.
Figure 5B:
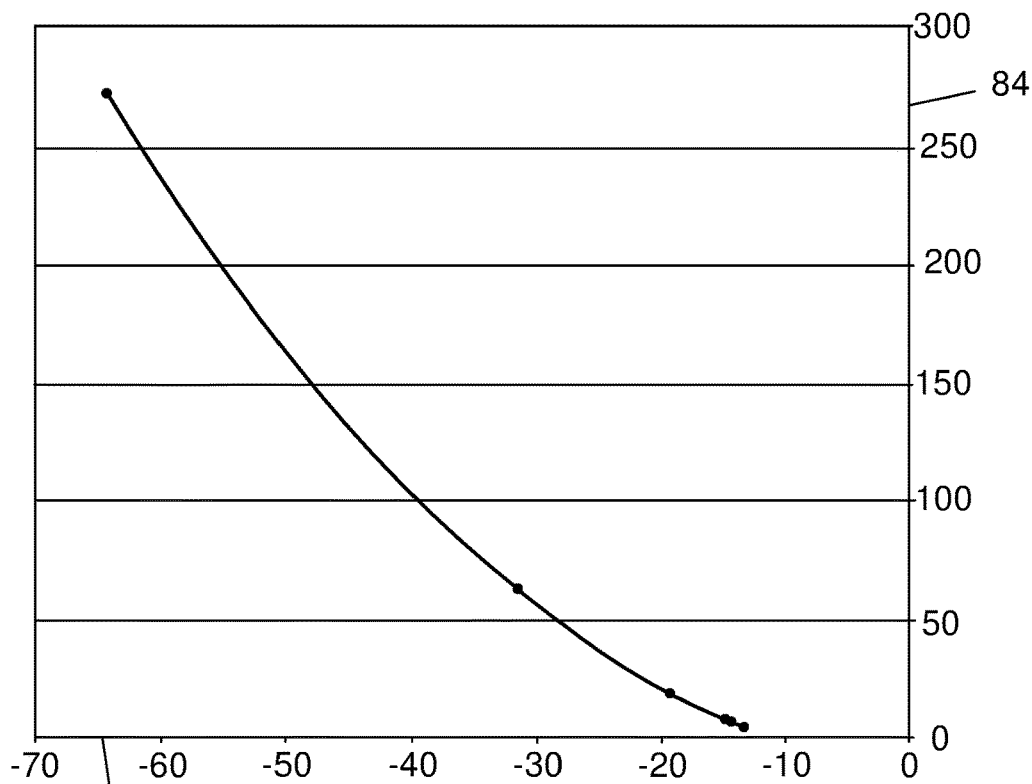
FIG. 5B illustrates a graphic representation of the conic constant of the first surface according to preferred embodiments of the invention, defined in function of its radius of curvature when the latter is negative.
Figure 5C:
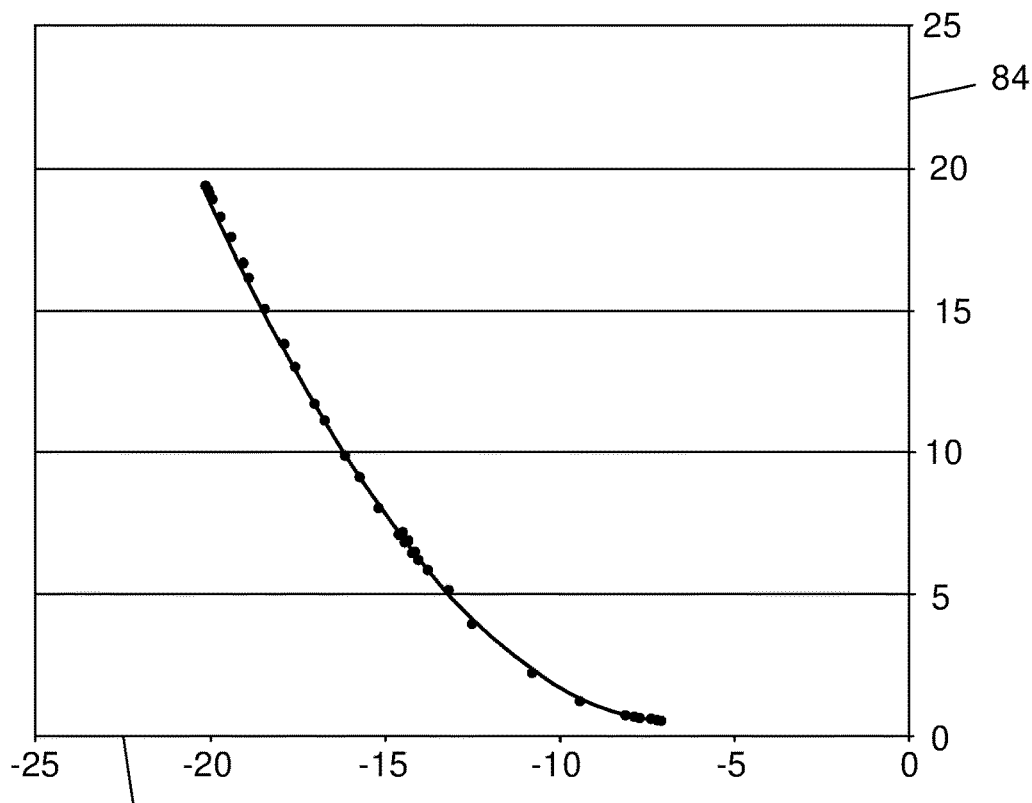
FIG. 5C illustrates a graphic representation of the conic constant of the second surface according to preferred embodiments of the invention, defined in function of its radius of curvature.

The IOL 1 according to the invention has an optical power depending on the refraction index associated to a material constituting the anterior 2 and posterior 3 optical surfaces, and on the geometry of these surfaces 2 and 3. The latter is determined (at least around their vertex 21 and 31) by the radii of curvature $R_{ant}$ and $R_{post}$ and by the conic constants $\kappa_{ant}$ and $\kappa_{post}$. According to preferred embodiments of the invention, $R_{ant}>0$ if and only if the optical power is greater than or equal to 14 D, and $R_{post}<0$ for all IOL optical power. The radius of curvature $R_{ant}$ depends both continuously and regularly on the optical power on the each of the intervals ]0 D, 13.5 D] and [14 D, 40 D[. The radius of curvature $R_{post}$ depends both continuously and regularly on the optical power. The invention very advantageously provides new smooth, continuous and regular relations for expressing the conic constants $\kappa_{ant}$ and $\kappa_{post}$ in function of the radii of curvature $R_{ant}$ and $R_{post}$. Those are illustrated by graphic representations in FIGS. 5A-C. For each of these figures, the axis 83 and 84 define a Cartesian coordinate system corresponding respectively to a radius of curvature measured in mm and to a conic constant. The FIG. 5A represents graphic representations of a function $\kappa_{ant}(R_{ant})$ defining the conic constant $\kappa_{ant}$ in function of the radius of curvature $R_{ant}$ for the anterior optical surface 2 of an IOL 1 whose optical power is greater than or equal to 14 D. The FIG. 5B represents graphic representations of a function $\kappa_{ant}(R_{ant})$ defining the conic constant $\kappa_{ant}$ in function of the radius of curvature $R_{ant}$ for the anterior optical surface 2 of an IOL 1 whose optical power is strictly smaller than 14 D. The FIG. 5C represents graphic representations of a function $\kappa_{post}(R_{post})$ defining the conic constant $\kappa_{post}$ in function of the radius of curvature $R_{post}$ for the posterior optical surface 3 of an IOL 1. Each of these FIGS. 5A-C represents both a collection (or plot) of points corresponding to measured values of conic constants in function of radii of curvature, and the graph of a very good interpolation and/or approximation function of this collection of points.

The graph of FIG. 5A represents the function $$\kappa_{ant}(R_{ant}) = -40[\text{erf}(0.092R_{ant}-2.29)+1]$$

which corresponds almost perfectly to the plotted points as it can be seen from the graphic representations. This function is completely new and very specific in the technical field of the invention. It defines a continuous and regular sigmoid that can be used for defining any appropriated conic constant $\kappa_{ant}$ in function of the radius of curvature $R_{ant}$ for an anterior optical surface 2 of an IOL 1 whose optical power is greater than or equal to 14 D.

The graph of FIG. 5B represents the function $$\kappa_{ant}(R_{ant}) = 0.0621R_{ant}^2 - 0.396R_{ant} - 11.035$$

which corresponds to a perfect interpolation (with correlation coefficient equal to 1) of the plotted points as it can be seen from the graphic representations. This function is completely new and very specific in the technical field of the invention. It defines a continuous and regular polynomial that can be used for defining any appropriated conic constant $\kappa_{ant}$ in function of the radius of curvature $R_{ant}$ for an anterior optical surface 2 of an IOL 1 whose optical power is strictly smaller than 14 D.

The graph of FIG. 5C represents the function $$\kappa_{post}(R_{post})=0.1032R_{post}^2+1.372\ R_{post}+5.1353$$

which corresponds to an almost perfect interpolation (with correlation coefficient equal to 0.99) of the plotted points represented (for example) for an optical power between 10 D and 27.5 D, as it can be seen from the graphic representations. This function is completely new and very specific in the technical field of the invention. It defines a continuous and regular polynomial that can be used for defining any appropriated conic constant $\kappa_{post}$ in function of the radius of curvature $R_{post}$ for a posterior optical surface 3 of an IOL 1.

The invention is not limited to the specific values of parameters of the above-mentioned functions $\kappa_{ant}(R_{ant})$ and $\kappa_{post}(R_{post})$. Any similar sigmoid or polynomial functions can be used, the spirit of the invention being in the use of relations of these kinds to express the conic constant in function the radius of curvature of each of the anterior 2 and posterior 3 optical surfaces. Examples of similar sigmoid or polynomial functions are provided in the disclosure of the invention either explicitly or in the form of appropriated intervals in which the numerical coefficients (A, B, C, D, a, b, c, f, g and h as denoted in the present document) of these functions vary. These intervals are not limiting the present disclosure. Moreover, other polynomial functions of other degrees than two can be used. For example, the function $\kappa_{ant}(R_{ant})$ represented in FIG. 5B could be replaced by $$\kappa_{ant}(R_{ant})=0.000009R_{ant}^4-0.0012R_{ant}^3+0.0128R_{ant}^2-1.2186R_{ant}-15.757$$

providing another very good interpolation of the plotted points in FIG. 5B. Nevertheless, the use of polynomials of order two is preferable for computing reasons. The function $\kappa_{ant}(R_{ant})$ represented in FIG. 5B for an anterior optical surface 2 of an IOL 1 whose optical power is strictly smaller than 14 D, can also be considered in the form of a very simple polynomial of order 1:

$$\kappa_{ant}(R_{ant})=-3.314R_{ant}-38.831$$

by reducing the conic constant for the anterior optical surface of the IOL 1 with optical power 13.5 D, in comparison with the preceding equations, which can facilitate the IOL 1 manufacture process. Such equation interpolates nicely the couple of values of radii of curvature and conic constants for the anterior optical surfaces of the IOL 1 with small optical powers (i.e. smaller than or equal to 13.5 D), and is very easy to use for computing reasons.

Figure 6A:
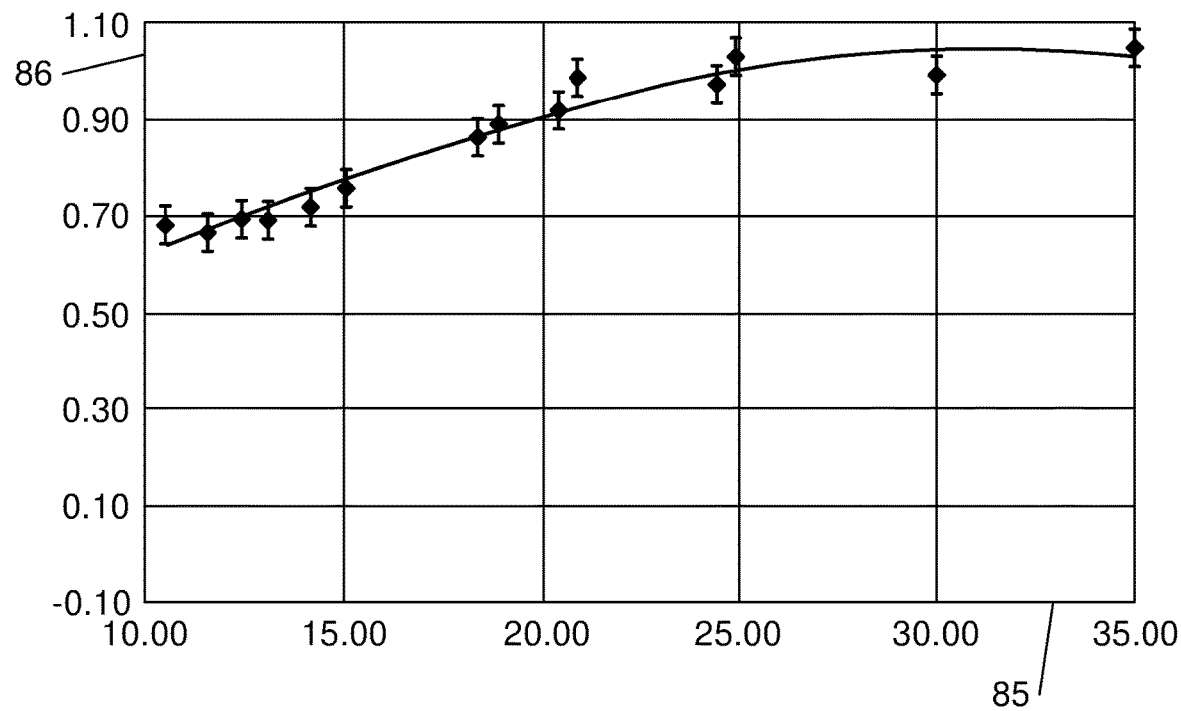
FIGS. 6A-C illustrate both experimental (on optical bench) and interpolated graphic representations of the EDOF, the) spherical aberration and the MTF of IOLs according to preferred embodiments of the invention, in function of their nominal optical power.

FIG. 6A illustrates a graphic representation of a collection of points endowed with error bars that correspond to experimental optical bench measurements of the EDOF of the IOL 1, read on the axis 86 and measured in diopter (D), as a function of the IOL optical power, read on the axis 85 and measured in diopter (D). The EDOF is defined as the power add in diopter from a MTF peak max to a MTF value of 0.17 at 50 Lp/mm. The measurements are made for an aperture of 3 mm with a cornea model providing a 0 µm spherical aberration (ISO1). This graphic representation is interpolated by a polynomial curve with equation $$EDOF=-0.00002x^3+0.0004x^2+0.0288x+0.3104$$

where x is the IOL optical power. As it can be seen from FIG. 6A, the invention provides an IOL 1 whose EDOF depends in a very limited way on the IOL optical power.

Figure 6B:
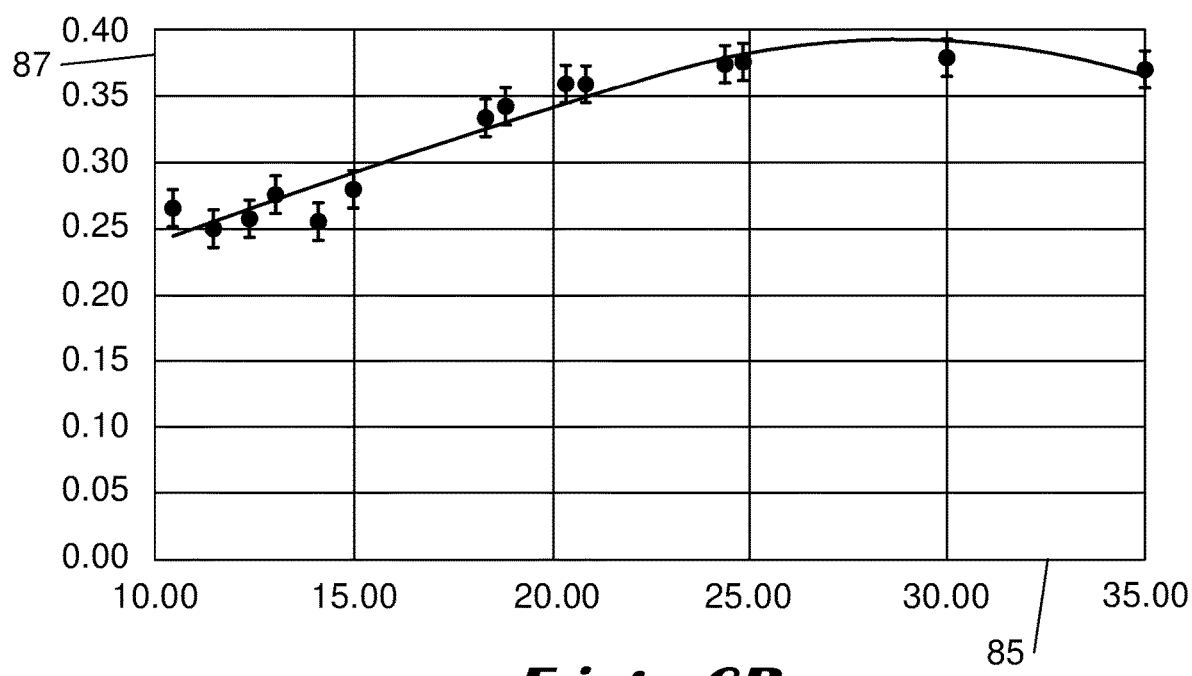

FIG. 6B illustrates a graphic representation of a collection of points endowed with error bars that correspond to experimental optical bench measurements of a fourth order longitudinal spherical aberration (LSA) of the IOL 1, read on the axis 87 and measured in micron (µm), as a function of the IOL optical power, read on the axis 85 and measured in diopter (D). The SA is measured at 50 Lp/mm and 4 mm of aperture. This graphic representation is interpolated by a polynomial curve with equation $$SA=-0.00002x^3+0.0008x^2-0.0025x+0.1982$$

where x is the IOL optical power. As it can be seen from FIG. 6B, the invention provides an IOL 1 whose SA depends in a very limited way on the IOL optical power. A slight decrease of SA is found with the optical power decrease. In fact, IOLs of lower power are actually flatter and more difficult to make aspherical. The EDOF values and the SA values follows the same trend, these being strongly correlated.

Figure 6C:
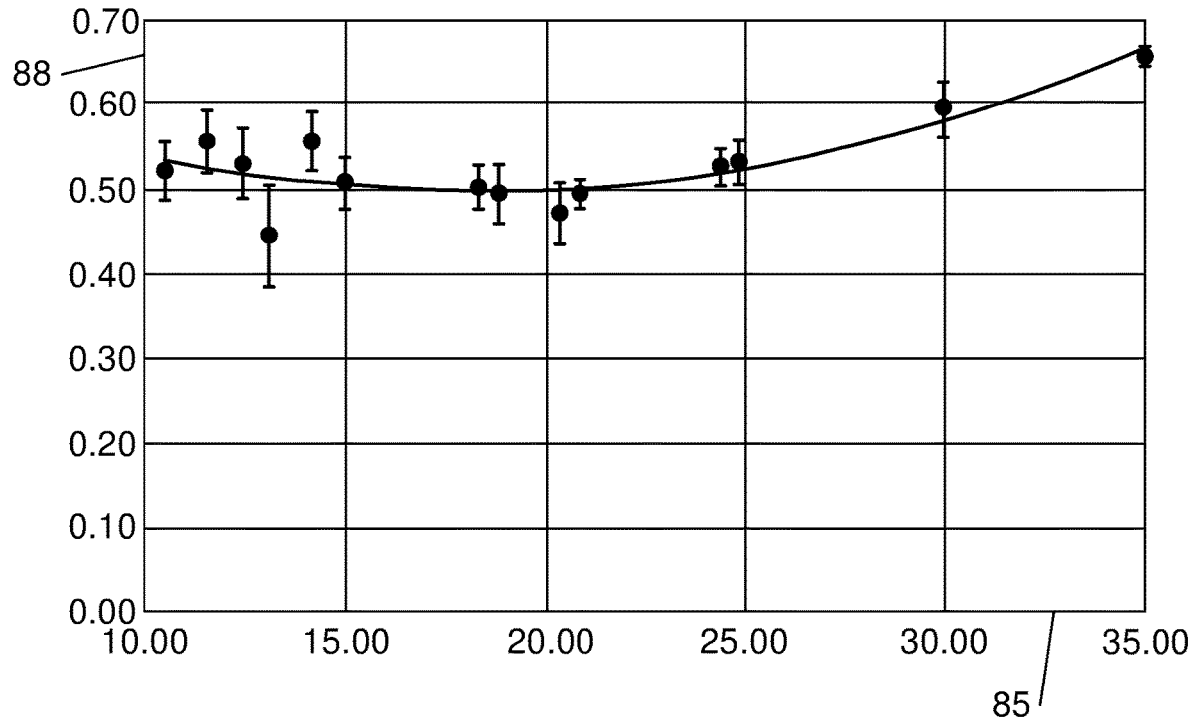

FIG. 6C illustrates a graphic representation of a collection of points endowed with error bars that correspond to experimental optical bench measurements of the MTF of the IOL 1, read on the axis 88 and evaluated at 50 cy/mm, as a function of the IOL optical power, read on the axis 85 and measured in diopter (D). The MTF is measured at 50 Lp/mm and 3 mm of aperture, in presence of a cornea model providing a 0.28 µm spherical aberration (ISO2). This graphic representation can be (quite weakly) interpolated by a polynomial curve with equation $$MTF=0.0006x^2-0.0222x+0.6994$$

where x is the IOL optical power. As it can be seen from FIG. 6C, the invention provides an IOL 1 whose MTF depends in a very limited way on the IOL optical power.

Figure 7:
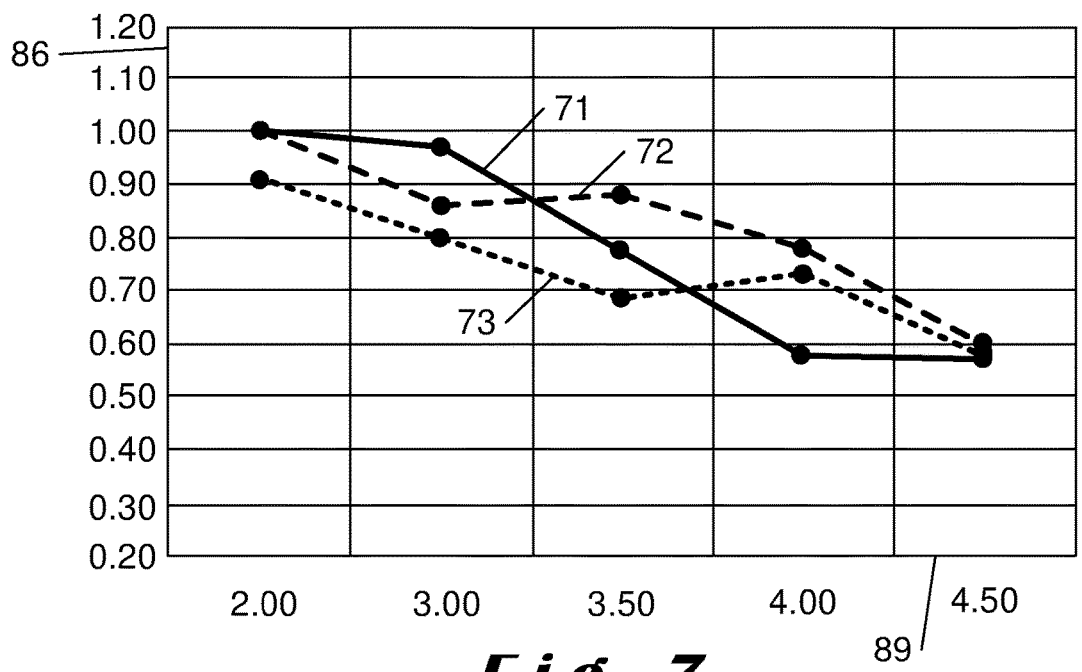
FIG. 7 illustrates graphic representations of the EDOF of an IOL of medium dioptric power according to a preferred embodiment of the invention, in conjunction of an aperture, for three different model corneal spherical aberrations.

FIG. 7 illustrates three graphic representations of average experimental optical bench measurements of the EDOF of IOLs 1 according to the invention, read on the axis 86 and measured in diopter (D), as a function of an aperture (being here the pupil diameter), read on the axis 89 and measured in millimeter (mm). The EDOF is defined as the power add in diopter from a MTF peak max to a MTF value of 0.17 at 50 Lp/mm. The average is computed for measurements on one IOL 1 of each of the optical powers 10 D, 15 D, 20 D, 25 D, 30 D and 35 D. The three graphic representations correspond to the use of three different cornea models providing three different corneal spherical aberrations:

- a cornea model providing a 0.00 µm corneal spherical aberration (corresponding to the reference number 71 or ISO1),
- a cornea model providing a 0.13 µm (±0.2 µm) corneal spherical aberration (at 5.15 mm aperture and IOL plan) (corresponding to the reference number 72),
- a cornea model providing a 0.28 µm (±0.2 µm) corneal spherical aberration (at 5.15 mm aperture and IOL plan) (corresponding to the reference number 73 or ISO2).

These graphic representations show clearly that the EDOF of the IOL 1 depends in a limited way on the aperture and on the corneal spherical aberrations. Moreover, for classical monofocal IOL known in the prior art, following the pupil dilatation, widening of a pin-hole effect decreases rapidly, as does the resulting EDOF. This trend is fundamentally different for the IOL 1 according to the invention as the EDOF remains relatively high despite an enlargement of the pupil diameter, and this for any of the three above-mentioned cornea models.

Figure 8:
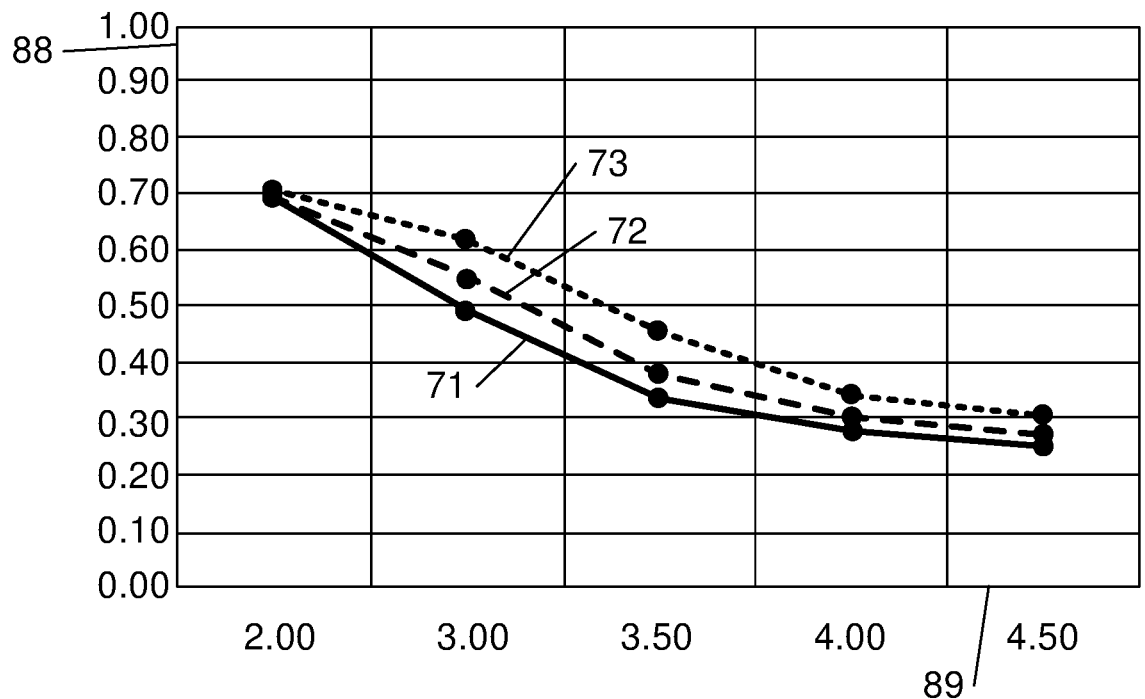
FIG. 8 illustrates graphic representations of the MTF of an IOL of medium dioptric power according to a preferred embodiment of the invention, in function of an aperture, for three different model corneal spherical aberrations.

FIG. 8 illustrates three graphic representations of average experimental optical bench measurements of the MTF of IOLs 1 according to the invention, read on the axis 88, as a function of an aperture (being here the pupil diameter), read on the axis 89 and measured in millimeter (mm). The MTF is measured at 50 Lp/mm. The average is computed for measurements on one IOL 1 of each of the optical powers 10 D, 15 D, 20 D, 25 D, 30 D and 35 D. The three graphic representations correspond to the use of the above-mentioned three different cornea models (corresponding to the reference numbers 71, 72 and 73). These graphic representations show that the MTF of the IOL 1 depends in a limited way on the aperture and on the corneal spherical aberrations.

FIG. 13 illustrates graphic representations of through focus MTF curves of two IOLs (corresponding respectively to curves 7A and 7B), read on the axis 88, as a function of the IOLs optical powers, read on the axis 85 and measured in diopter (D), in a medium range of (far) optical power (around 20 D). The MTF is measured on a optical bench equipped with a cornea model providing a 0.00 µm spherical aberration (ISO1), at 50 Lp/mm and 3 mm aperture. These curves 7A and 7B correspond to the MTF measurements for a standard monofocal IOL and for the IOL 1 respectively. The elongated focus of the IOL 1 according to the invention is visible in FIG. 13. An asymmetric MTF peak is clearly shown in the case of the IOL 1 according to the invention with an elongated focus towards higher powers (closer distances), while the MTF peak of the standard monofocal lens is basically symmetric with respect to the power at best focus, this focus being assigned to far distances. These differences, as evidenced onto the optical bench, would account for superior EDOF and better clinical visual acuity at the intermediate distance of the IOL 1 according to the invention.

Each of the FIGS. 9A-C illustrates graphic representations of experimental optical bench measurements of the fourth order spherical aberration (denoted hereafter by SA), read on the axis 90 and measured in micron (µm), as a function of an aperture (being the pupil diameter), read on the axis 89 and measured in millimeter (mm). For each of these figures, the SA is measured at 50 Lp/mm and for:
- one of the three above-mentioned cornea models considered alone (corresponding to the reference number 74)
- an IOL 1 according to the invention considered alone (corresponding to the reference number 75)
- said specific cornea model combined with said IOL 1 (corresponding to the reference number 76)

The cornea models considered in FIGS. 9A, 9B and 9C are respectively:
- the cornea model providing a 0.28 µm (±0.2 µm) corneal spherical aberration (at 5.15 mm aperture and IOL plan),
- the cornea model providing a 0.13 µm (±0.2 µm) corneal spherical aberration (at 5.15 mm aperture and IOL plan), and
- the cornea model providing a 0.00 µm corneal spherical aberration.

With respect to classical known monofocal IOLs, the IOL 1 differs by the amount of SA it provides alone. The SA of the IOL 1 is negative and decreases rapidly with the aperture. The SA is much more negative for the IOL 1 in comparison with the SA of classical known monofocal IOLs. As a consequence, the SA resulting from the combination of any cornea model and the IOL 1 is basically determined by the SA of the IOL 1, since the SA of the IOL 1 overcompensates the (small) positive SA of any of the cornea models. The residual SA is then advantageously only very slightly affected by the choice of cornea model.

Following the EDOF existence for the IOL 1 according to the invention, a combined optical refraction of the anterior 2 and posterior 3 optical surfaces with an average cornea model (preferably, as defined in paragraph) [0049]) (arranged on the optical axis Z anteriorly with respect to the IOL 1) provides a continuous and regular map 9 of optical power comprising a central global maximum 91 along the optical axis Z surrounded by a spread central region 92 of lower optical power (corresponding to the EDOF). This map 9 is illustrated in FIGS. 10A and 10B, for an IOL optical power of 35 D and 20 D respectively, within a (reading) window centered on the optical axis Z with a diameter 4 mm. It is recalled that said IOL optical power is defined as a mean optical power (the optical power that is represented by the map 9) measured without correction within a (reading) window centered on the optical axis Z with a diameter 3 mm. The central region 92 is spread on about a half of a diameter d of the anterior 2 and the posterior 3 optical surfaces, and surrounded by a first ring 93, 93' of points of the map 9 that are either inflexion points (in the case of FIG. 10A) or local minima of optical power (in the case of FIG. 10B). This first ring 93, 93' corresponds in both case to radial change in trend of optical power. The FIG. 10B illustrated more faithfully such a general map 9 of optical power for optical power around 20 D. In this case, the map 9 also comprises:
- said first ring 93 of local minima of optical power surrounding the spread central region 92, and
- a second ring 94 of local maxima of optical power surrounding the first ring 93.

More generally, IOLs 1 according to some embodiments of the invention comprise a collection of rings such as the rings 93 and 94, of varying maximal and minimal optical power alternating progressively. It has to be pointed out that the map 9 for any IOL optical power is very smooth, both continuous and regular. It does not divide into zone partition with a fixed optical power.

Sectional representations of the IOL 1 according to preferred embodiments of the invention are additionally illustrated in FIG. 11A (for an optical power equal to 10 D), in FIG. 11B (for an optical power equal to 24 D) and in FIG. 110 (for an optical power equal to 35 D). The section of these IOLs 1 is made along a plane comprising the optical axis Z. The above-commented anterior 2 and posterior 3 optical surfaces geometry and concavity or convexity are visible in these FIGS. 11A-C. These anterior 2 and posterior 3 optical surfaces are separated by an internal body 41 of the central optic part 4 which is made from a raw biomaterial. The internal body 41 has a predetermined central thickness E, which is measured along the optical axis Z, and comprised between 0.3 and 0.7 mm, depending regularly on the IOL optical power in such way that it is provided an IOL peripheral thickness comprised between 0.2 and 0.3 mm (preferably of about 0.25 mm) for connecting the flexible haptics 5 to the central optic part 4.

As illustrated in FIG. 12A, the central optic part 4 of the IOL 1 preferably has a principal optical plane (M) separated from the flexible haptics (5) apex (51) by a predetermined distance (HC) measured along the optical axis (Z), comprised between 0.00 and 0.45 mm. This distance (HC) depending continuously and regularly on the IOL 1 optical power through a function, the graph of which is represented in FIG. 12B. The distance (HC) is read on the axis 62, measured in millimeter (mm), as a function of the optical power which is read on the axis 61, measured in diopter (D). This function is continuously increasing for increasing optical powers and its graph presents a sigmoid profile. This distance (HC) is advantageously computed in view of the anterior 2 and posterior 3 optical surfaces geometry for guaranty the longitudinally stable (invariant upon IOL power) position of the IOL 1 principal optical plan with respect the optical axis Z when it is implanted in an eye.

In other words, the present invention relates to an intraocular lens 1 with extended depth of focus comprising aspheric anterior 2 and posterior 3 optical surfaces. A specific aspheric geometry of these optical surfaces 2 and 3 is described in the framework of this invention.

The present invention was described in relation to the specific embodiments which have a value that is purely illustrative and should not be considered to be limiting. The person skilled in the art will notice that the present invention is not limited to the examples that are illustrated and/or described here above. The invention comprises each of the new technical characteristics described in the present document, as well as their combinations.

The invention claimed is:

1. Intraocular lens comprising:
   an anterior optical surface, and
   a posterior optical surface,
   both extending radially outward relative to an optical axis (Z);
   characterized in that:
   a first surface among the anterior and posterior optical surfaces is defined by the equation:

$$z_{st}(r) = \frac{r^2}{R_{st}\left(1 + \sqrt{1 - \frac{(1 + \kappa_{st}(R_{st}))r^2}{R_{st}^2}}\right)} + \sum_{i \geq 2} \alpha_{2i}^{st} r^{2i}$$

where:
   $z_{st}(r)$ is a component, measured along the optical axis (Z), of a displacement vector from a vertex of the first surface,
   to any point of the latter at a radius r from the optical axis (Z);
   $R_{st}$ is a radius of curvature of the first surface evaluated at said vertex;
   $\kappa_{st}(R_{st})$ is a conic constant of the first surface evaluated at said vertex and defined in function of said radius of curvature $R_{st}$ of the first surface by the relation:

$$\kappa_{st}(R_{st}) = \begin{cases} a R_{st}^2 + b R_{st} + c & \text{if } R_{st} < 0 \\ A[\text{erf}(B R_{st} + C) + D] & \text{if } R_{st} > 0 \end{cases}$$

where erf denotes a Gauss error function, and where a, b, c, A, B, C, D are constant real numbers such that:
   a∈[0.050; 0.075], b∈[−1; 0], c∈[−20; 0], A∈[−41; −39],
   B∈[0.07; 0.13], C∈[−2.6; −2.0] and D∈[0.75; 1.25];
   $\alpha_{2i}^{st}$ is a coefficient of asphericity of order 2i of the first surface;
   a second surface among the anterior and posterior optical surfaces and different from said first surface is defined by the equation:

$$z_{nd}(r) = \frac{r^2}{R_{nd}\left(1 + \sqrt{1 - \frac{(1 + \kappa_{nd}(R_{nd}))r^2}{R_{nd}^2}}\right)} + \sum_{i \geq 2} \alpha_{2i}^{nd} r^{2i}$$

where:
   $z_{nd}(r)$ is a component, measured along the optical axis (Z), of a displacement vector from a vertex of the second surface,
   to any point of the latter at a radius r from the optical axis (Z);
   $R_{nd} < 0$ is a radius of curvature of the second surface evaluated at said vertex;
   $\kappa_{nd}(R_{nd})$ is a conic constant of the second surface evaluated at said vertex and defined in function of said radius of curvature $R_{nd}$ of the second surface by the relation:

$$\kappa_{nd}(R_{nd}) = fR_{nd}^2 + gR_{nd} + h$$

where f, g, h are constant real numbers such that:
   f∈[0.08; 0.12], g∈[1.0; 1.6] and h∈[0; 9];
   $\alpha_{2i}^{nd}$ is a coefficient of asphericity of order 2i of the second surface;
   the anterior and posterior optical surfaces being such that the intraocular lens provides an extended depth of focus, wherein
   the coefficients of asphericity of order smaller than or equal to 10 of the first and second surfaces are non-zero,
   the coefficients of asphericity of the first and second surfaces are bounded in absolute value by 0.1, and
   the coefficients of asphericity of order strictly greater than 10 of the first and second surfaces are substantially equal to zero.

2. Intraocular lens according to claim 1, characterized in that it has an optical power comprised between 10D and 35D.

3. Intraocular lens according to claim 1, characterized in that:
   it has an optical power strictly smaller than 14D, and $R_{st} < 0$; or
   it has an optical power greater than or equal to 14D, and $R_{st} > 0$.

4. Intraocular lens according to claim 1, characterized in that
   $0 < |\alpha_{10}^{st}| < |\alpha_{8}^{st}| < |\alpha_{6}^{st}| < |\alpha_{4}^{st}| < 0.01$ and/or
   $0 < \alpha_{10}^{nd} < \alpha_{8}^{nd} < \alpha_{6}^{nd} < \alpha_{4}^{nd} < 0.01$.

5. Intraocular lens according to claim 1, characterized in that the first surface is the anterior optical surface, and the second surface is the posterior optical surface, the optical axis (Z) being directed from the anterior surface to the posterior surface.

6. Intraocular lens according to claim 1, characterized in that the anterior and the posterior optical surfaces are cut from an hydrophobic raw biomaterial of refraction index comprises between 1.40 and 1.65.

7. Intraocular lens according to claim 1, characterized in that the anterior and the posterior optical surfaces are separated by an internal body of a predetermined central thickness (E), measured along the optical axis (Z), comprises between 0.30 and 0.70 mm.

8. Intraocular lens according to claim 1, characterized in that both the anterior and the posterior optical surfaces have a diameter (d), measured perpendicularly to the optical axis (Z), comprises between 4.70 and 5.00 mm.

9. Intraocular lens according to claim 1, characterized in that a combined optical refraction of the anterior and the posterior optical surfaces with a cornea model anteriorly external to the intraocular lens provides a continuous and regular map of optical power comprising a central global maximum along the optical axis (Z) surrounded by a spread central region of lower optical power.

10. Intraocular lens according to claim 9, characterized in that the central region is spread on about a half of a diameter (d) of the anterior and the posterior optical surfaces, and surrounded by a first ring of points of the map that are either inflexion points or local minima of optical power.

11. Intraocular lens according to claim 10, characterized in that the map further comprises a second ring of points that are local maxima of optical power, said second ring surrounding said first ring.

12. Intraocular lens according to claim 1, characterized in that it comprises:
- a central optic part whose:
  - an anterior surface is the anterior optical surface, and
  - a posterior surface is the posterior optical surface;
- a plurality of flexible haptics connected to the central optic part, configured for stabilizing the intraocular lens into a capsular bag of an aphakic eye.

13. Intraocular lens according to claim 12, characterized in that a distance (HC), measured along the optical axis (Z), between a flexible haptic apex and a principal optical plane (M) of the central optic part corresponds to an image of an optical power of the intraocular lens by a continuous regular function, continuously increasing for increasing optical powers, and bounded by 0.45 mm, in such a way that said principal optical plane (M) is stable parallel to the optical axis (Z) when the intraocular lens is implanted in a capsular bag of an aphakic eye.

14. Intraocular lens according to claim 12, characterized in that it comprises four closed flexible haptics each forming a loop based on the central optic part.

15. Intraocular lens according to claim 1, characterized in that it is shape invariant under a rotation of 180° around the optical axis (Z).

16. Manufacture method of an intraocular lens according to claim 1, comprising the steps:
- (a) modeling an optic having aspheric optical surfaces profile pattern;
- (b) calculating a refractive efficiency distribution for light propagating through the modelled optic;
- (c) selecting aspheric optical surfaces profile parameters according to the calculated refractive efficiency distribution, so as to achieve desired refractive efficiencies; and
- (d) forming the modeled optic with the selected parameters from a raw biomaterial.

17. Manufacture method according to claim 16, characterized in that the aspheric optical surfaces profile parameters selected in step (c) depend continuously and regularly on an optical power of the intraocular lens.

18. Manufacture method according to claim 16, characterized in that a conic constant $\kappa_{st}$ of a first surface among these aspheric optical surfaces, evaluated at its vertex, is selected in step (c) in function of a radius of curvature $R_{st}$ of the first surface evaluated at this vertex by the relation $$\kappa_{st}(R_{st}) = \begin{cases} a R_{st}^2 + bR_{st} + c & \text{if } R_{st} < 0 \\ A[\text{erf}(BR_{st} + C) + D] & \text{if } R_{st} > 0 \end{cases}$$

where erf denotes a Gauss error function, and where a, b, c, A, B, C, D are constant real numbers; and a conic constant $\kappa_{nd}$ of a second surface among these aspheric optical surfaces, evaluated at its vertex, is selected in step (c) in function of a radius of curvature $R_{nd}$ of the second surface evaluated at this vertex by the relation $$\kappa_{nd}(R_{nd}) = fR_{nd}^2 + g R_{nd} + h$$

where f, g, h are constant real numbers.

19. Manufacture method according to claim 16, characterized in that the intraocular lens is according to claim 13, and in that the manufacture method comprises of the step of selecting a distance (HC), measured along the optical axis (Z), between a flexible haptic apex and a principal optical plane (M) of the central optic part, in function of an optical power of the intraocular lens as an image of the latter by a continuous and regular function, continuously increasing for increasing optical powers, and bounded by 0.45 mm, so as to achieve a desired longitudinal stability of the principal optical plane (M) parallel to the optical axis (Z) when the intraocular lens is implanted in a capsular bag of an aphakic eye.

* * * * *